(12) United States Patent
Nakamura

(10) Patent No.: US 8,447,074 B2
(45) Date of Patent: May 21, 2013

(54) IMAGE PROCESSING APPARATUS, IMAGE PROCESSING METHOD, AND PROGRAM

(75) Inventor: Kenichiro Nakamura, Saitama (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 12/842,128

(22) Filed: Jul. 23, 2010

(65) Prior Publication Data
US 2011/0038510 A1 Feb. 17, 2011

(30) Foreign Application Priority Data
Aug. 17, 2009 (JP) ................. P2009-188369

(51) Int. Cl.
*G06K 9/00* (2006.01)
*H04N 5/235* (2006.01)

(52) U.S. Cl.
USPC ..................... 382/107; 348/229.1

(58) Field of Classification Search
USPC ......... 382/107; 348/229.1, 296, 362; 345/418
See application file for complete search history.

(56) References Cited

FOREIGN PATENT DOCUMENTS

| JP | 2003-216932 | * | 7/2003 |
|---|---|---|---|
| JP | 2004-125708 | | 4/2004 |
| JP | 2004-257934 | * | 9/2004 |

* cited by examiner

*Primary Examiner* — Amara Abdi
(74) *Attorney, Agent, or Firm* — Finnegan, Henderson, Farabow, Garrett & Dunner, LLP

(57) ABSTRACT

An image processing apparatus includes an outline distance estimating unit that acquires distance information on an outline portion of an area included in an image; an area dividing unit that divides an area included in an image on the basis of pixel attribute values; an area-plane estimating unit that estimates an area plane composing each area by using the distance information on the outline portion of each area resulting from the division to calculate an area-plane definitional equation; an abnormal data determining unit that compares the area plane with each coordinate position on a three-dimensional space indicated by the distance information to determine the distance information having a high degree of shift from the area plane to be abnormal data; and an area interpolating unit that estimates the distances inside the area by using the distance information resulting from removal of the abnormal data from the distance information.

10 Claims, 15 Drawing Sheets

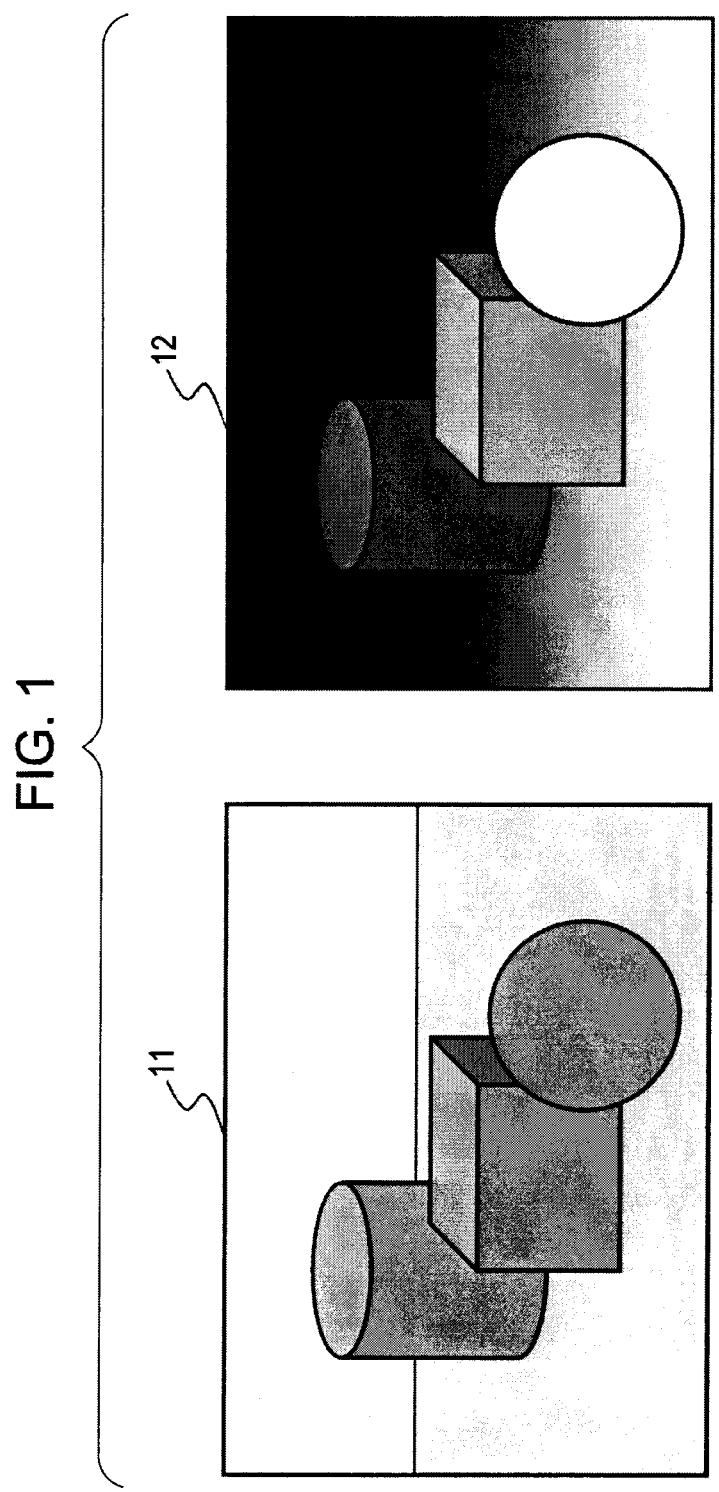

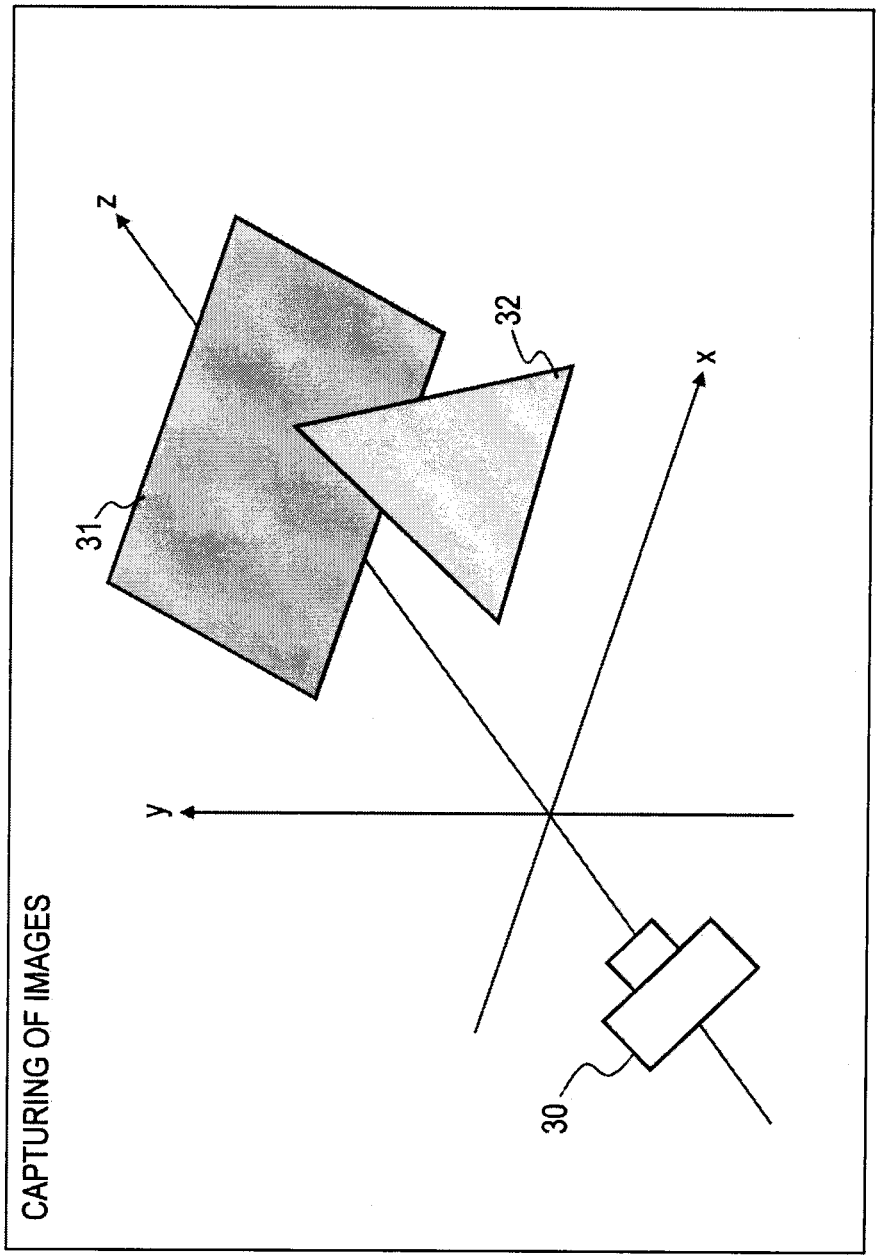

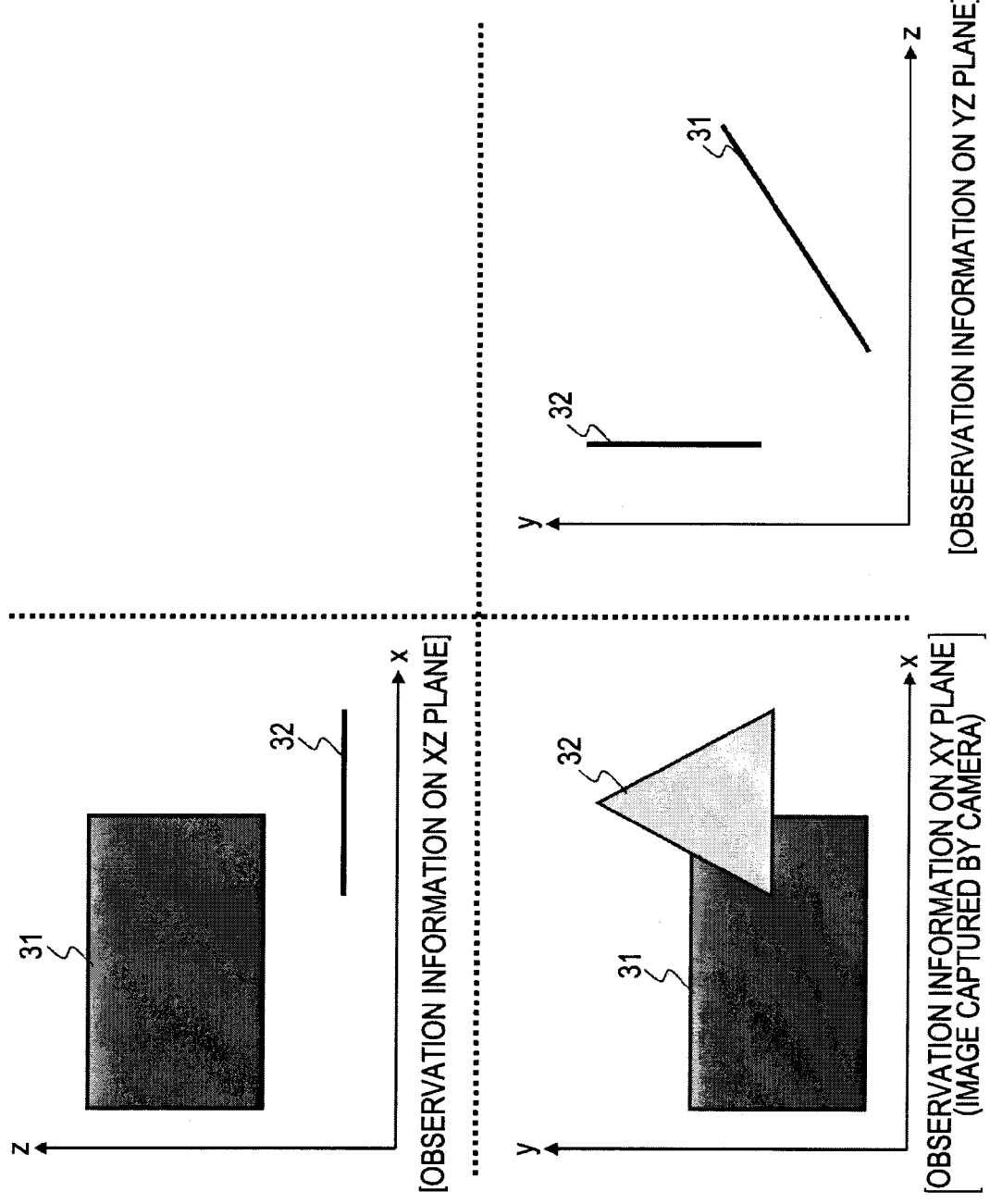

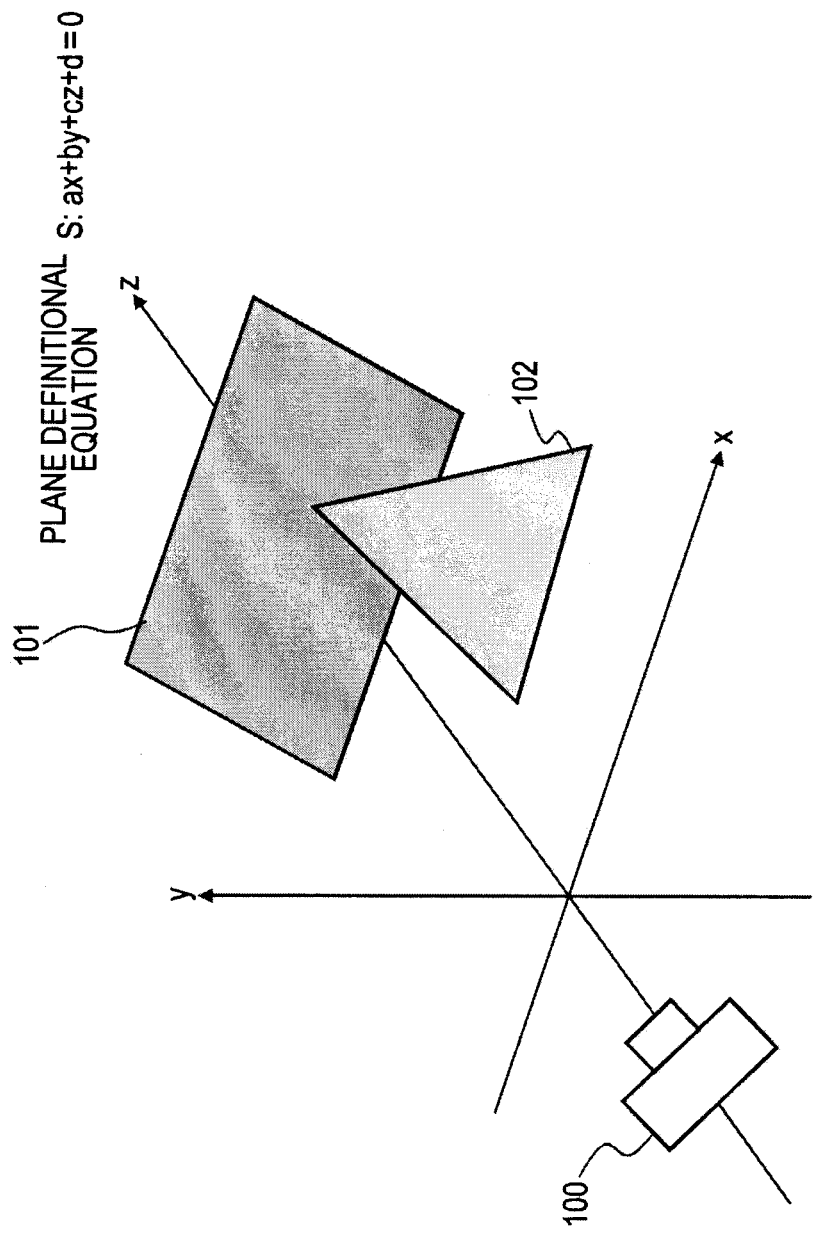

DISTANCE IMAGE b

DISTANCE IMAGE c
AFTER INTERPOLATION

DISTANCE IMAGE a
PLANE DEFINITIONAL EQUATION S: $ax+by+cz+d=0$
(GREATLY SHIFTED FROM PLANE DEFINITIONAL EQUATION)

FIG. 9
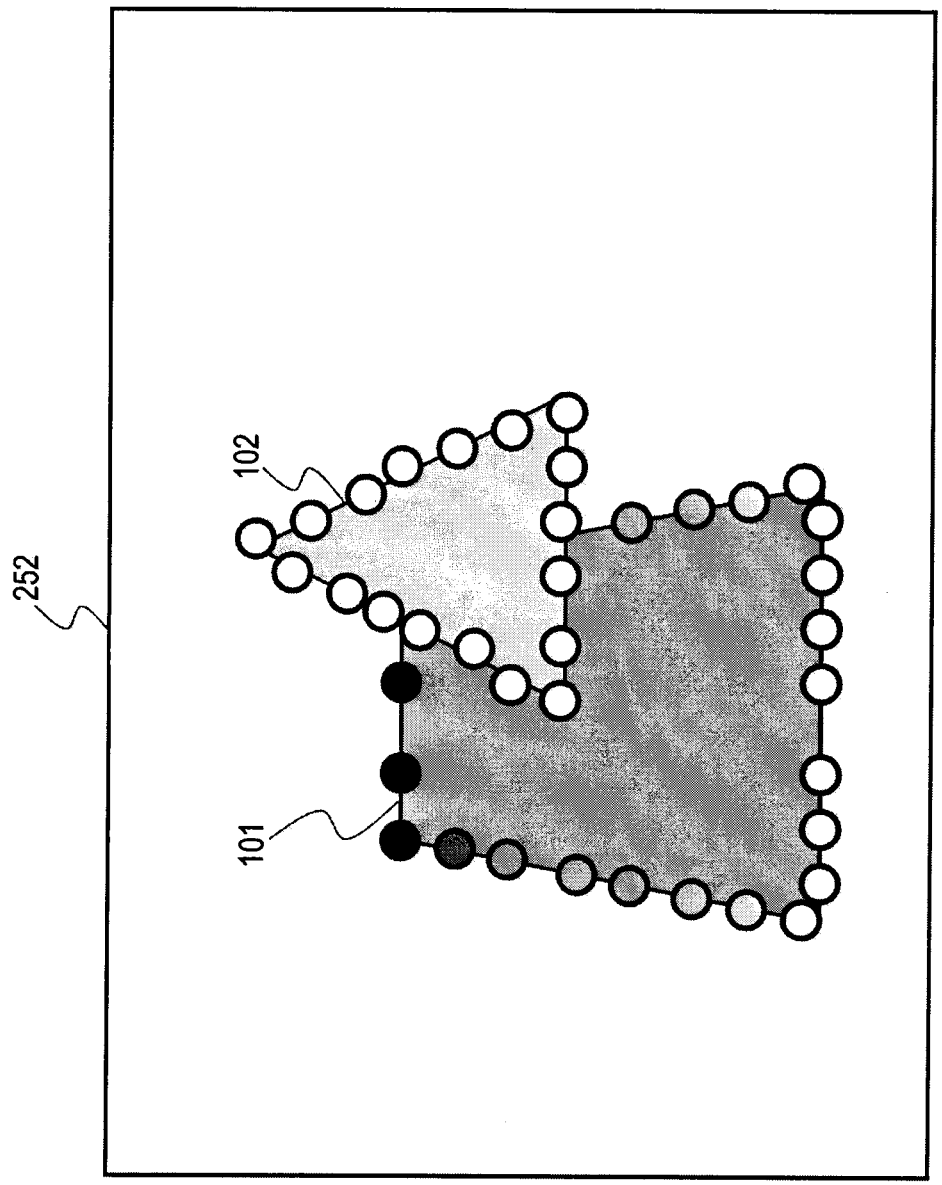
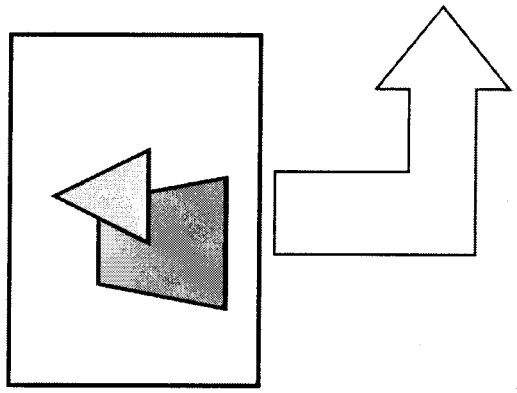

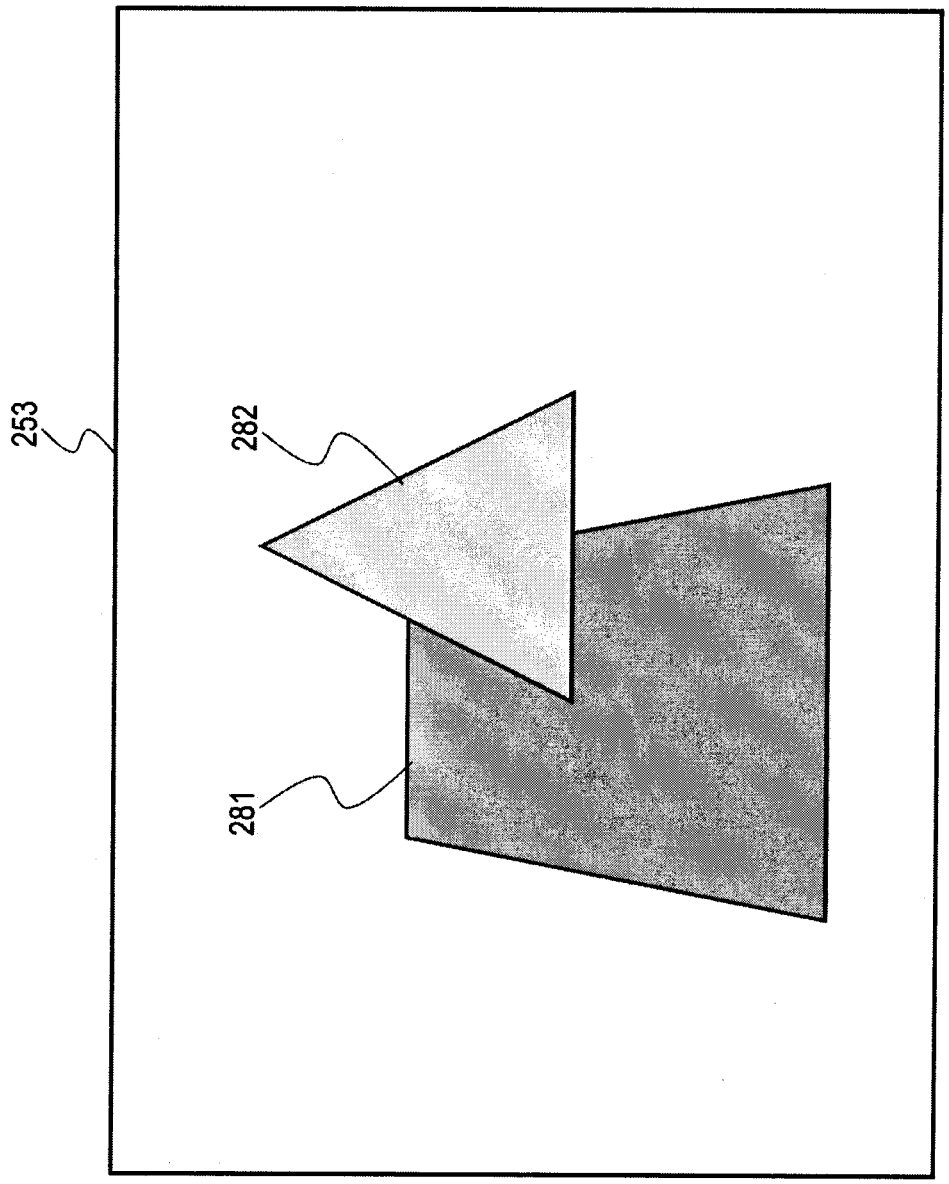

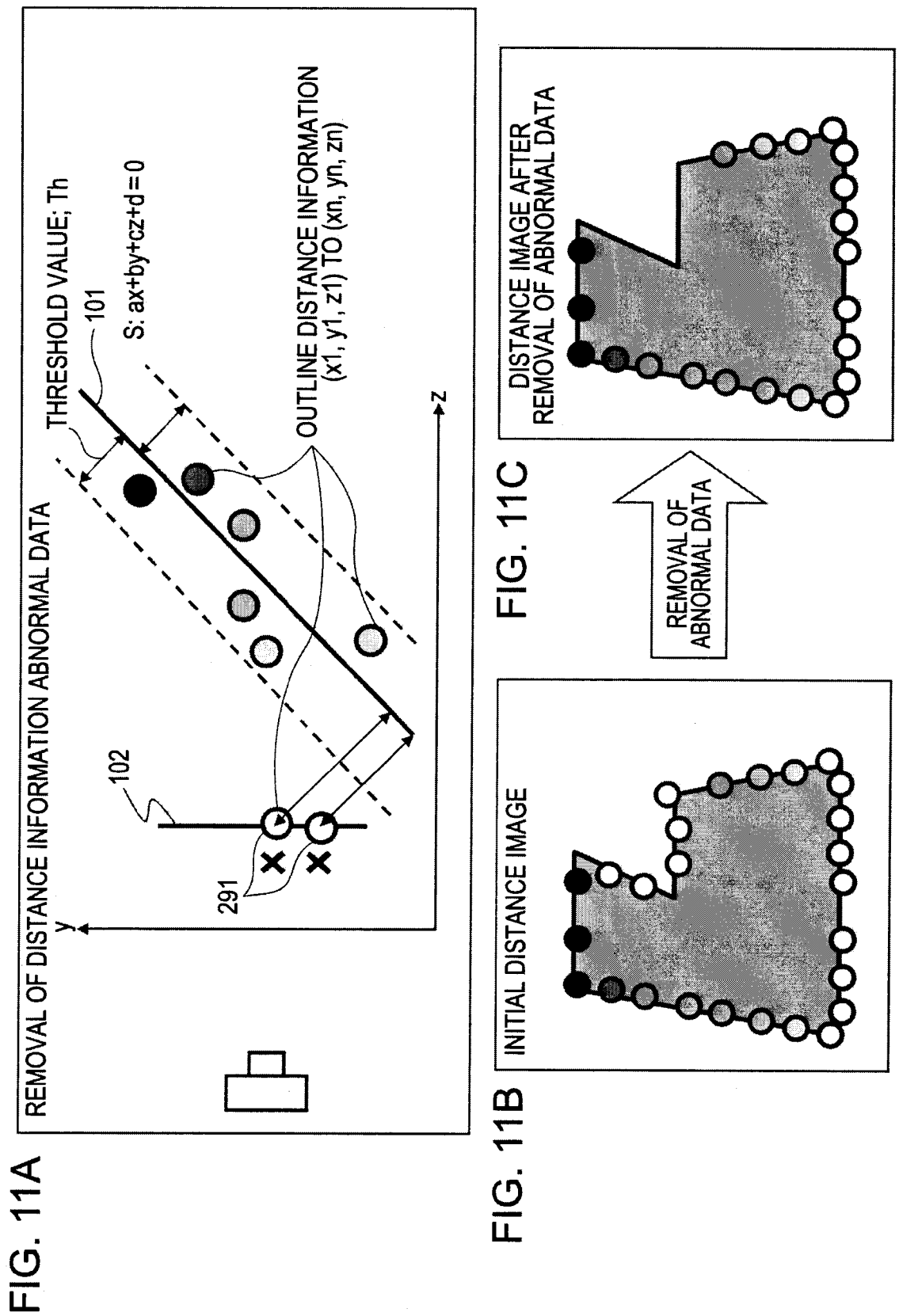

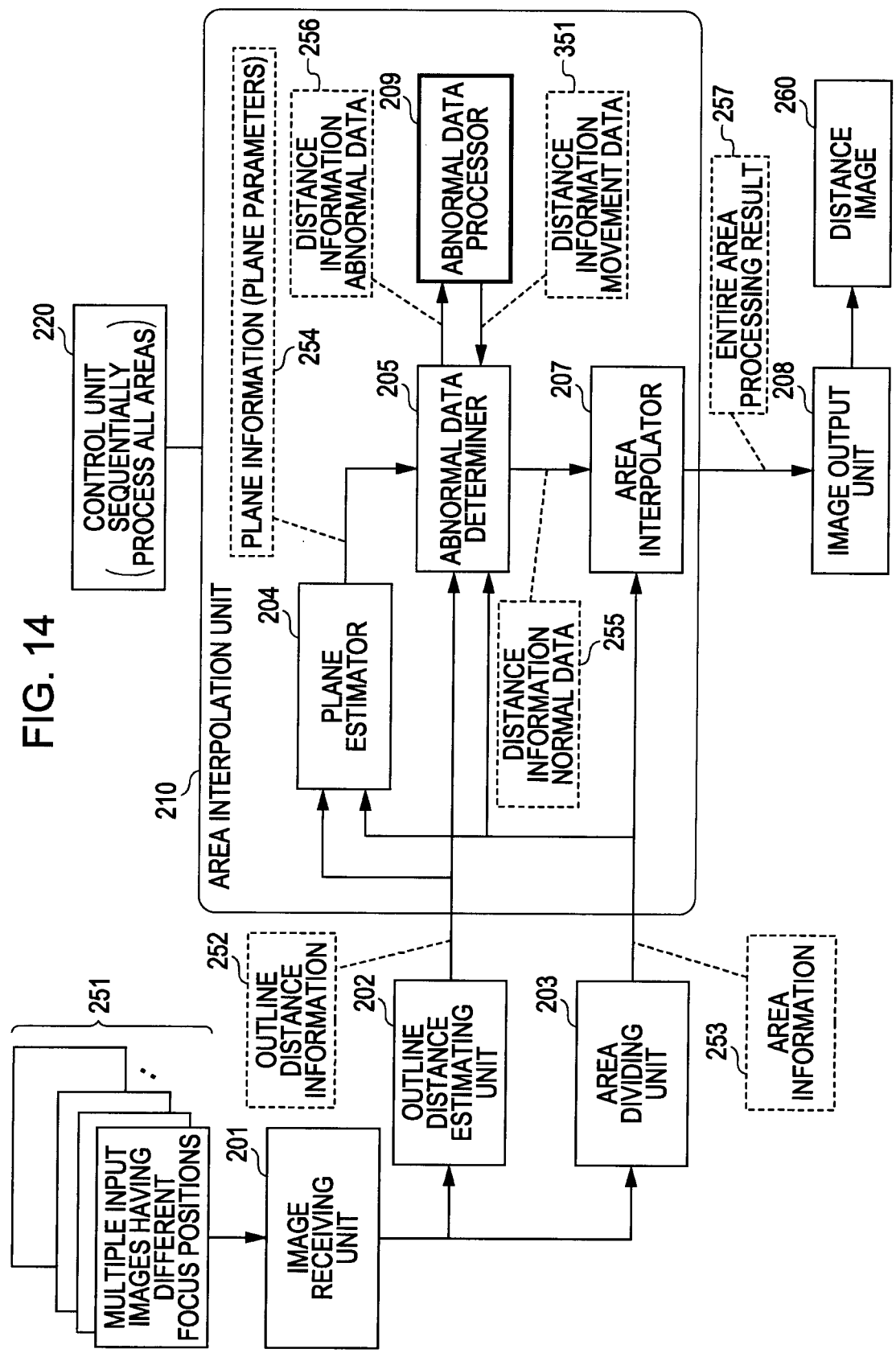

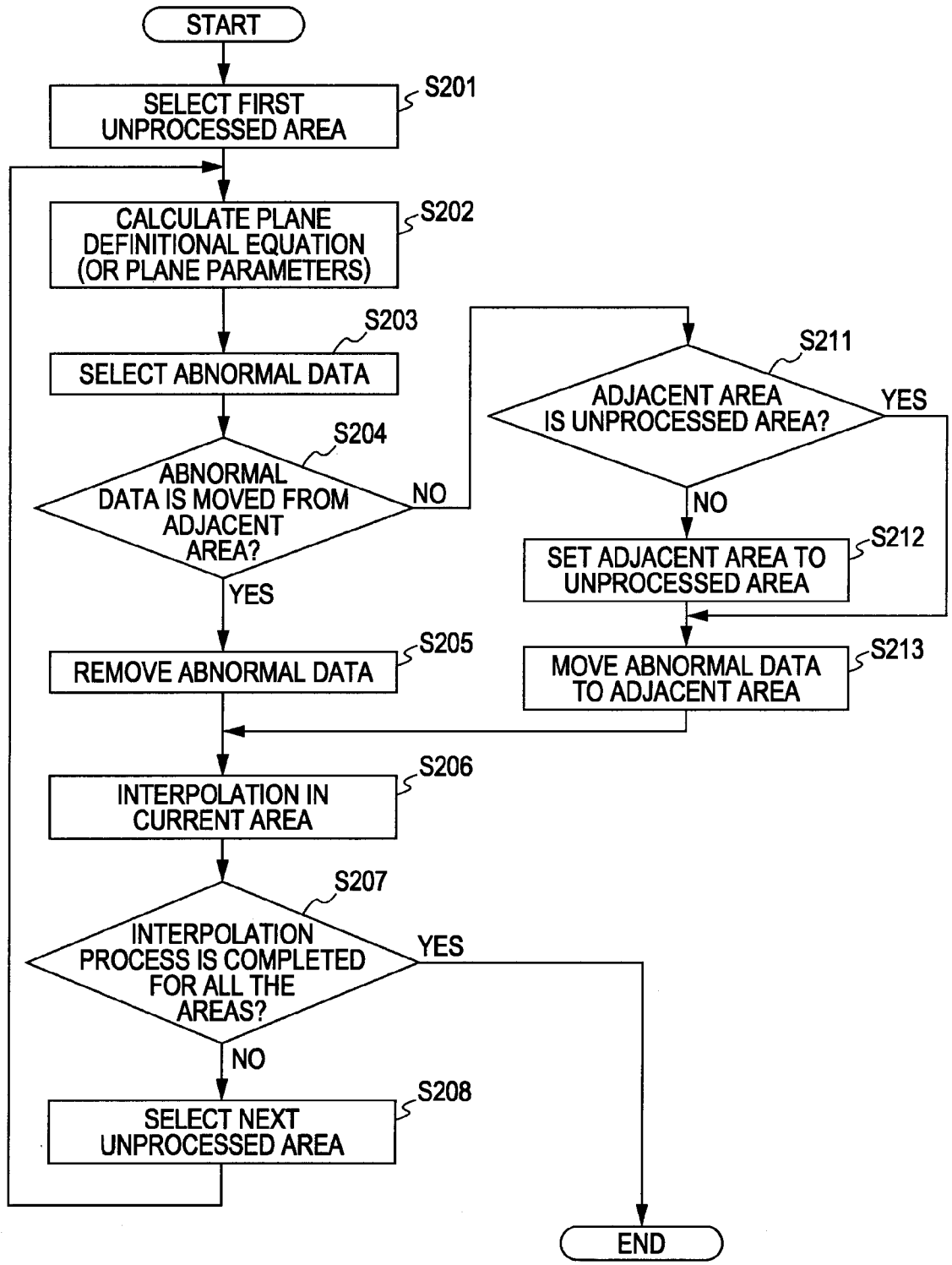

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and program. More particularly, the present invention relates to an image processing apparatus, an image processing method, and a program that calculate the distance to each object included in an image captured by a camera.

2. Description of the Related Art

Data in which information about the distance to each object included in an image captured by a camera is represented in association with the original image is called a distance map. Different pixel values are set for different distance values in a distance image in which the distance map is represented as an image. For example, nearer objects are represented as pixels of higher luminance values and farther objects are represented as pixels of lower luminance values in the distance image. FIG. 1 shows an example of an image and a distance image. Referring to FIG. 1, a distance image 12 is based on an image 11. The distances to objects are represented by varying the luminance values in the distance image, as in the example in FIG. 1.

The distance map and the distance image can be used in, for example, analysis of the three-dimensional shape of an object. Generation of the distance map and the distance image by image analysis or analysis of a three-dimensional shape is disclosed in, for example, Japanese Unexamined Patent Application Publication No. 2003-216932, Japanese Unexamined Patent Application Publication No. 2004-125708, and Japanese Unexamined Patent Application Publication No. 2004-257934.

The generation of the distance image from an image captured by a camera will now be described. In order to generate the distance image, it is necessary to acquire the distance between the camera and each object. Several technologies to analyze the distance to an object include a technology to find a focus position where the most clear outline or pattern of the object is mapped while varying the focus position of the lens.

This technology is one of the methods widely used in an automatic focus mechanism for compact cameras and is also called a contrast detection technology. A high contrast is achieved when the object is in focus. In measurement of a distance by the contrast detection technology, a variation in the contrast is detected to determine the focus position of each object and the distance corresponding to the focus position is detected as the distance to the object.

Methods of detecting the pixel positions where the luminance values of pixels are sharply varied by using various differential filters are commonly used in the contrast detection technology. The outlines and patterns of objects can be acquired by such methods. The differential filter used to detect the outlines and patterns is hereinafter referred to as an edge detection filter. The luminance values of pixels are directly acquired from the image data in gray-scale images whereas the luminance values of pixels are calculated from linear combination of multiple luminance components in color images.

Recording the positions on the outline or pattern of each object detected in an image while sequentially moving the focus position of the lens from a shortest distance to an infinite distance by using the contrast detection technology allows distance information about the outline or pattern of the object included in the image to be acquired to create the distance map.

However, the outline of each object is not constantly detected in an actual image because of, for example, lack of the difference in luminance between the pixels on the outline of the object. In addition, since nothing is detected with the edge detection filter in an area having no pattern even if the focus position is varied, the resulting distance map includes many undefined regions, that is, regions in which the distances to the object are not defined. Such a region is hereinafter referred to as a distance undefined region.

Estimation of the distances in the distance undefined region to acquire the distance image of the entire image will now be described. In order to calculate the distances in the distance undefined region, an interpolation process using known information around the distance undefined region is generally used. In other words, known distance information observed at the positions on the outline or pattern of an object is used to estimate the distance information about the distance undefined region in the inner area of the object (hereinafter referred to as an object area).

Specifically, as in an example shown in FIG. 2A, an image of an object A 21 is captured by a camera 20. The positions on the outline or pattern of the object detected in the image are recorded while the focus position of the lens is being sequentially moved from a shortest distance to an infinite distance by using the contrast detection technology in the capture of the image. This results in a distance image 22 before interpolation shown in FIG. 2B.

An edge can be detected with the edge detection filter in the outline portion of the object A 21 in the distance image 22 before interpolation shown in FIG. 2B to provide the distance information by the contrast detection. Circles represented by different grayscale values in the outline portion of the object A 21 in the distance image 22 before interpolation indicate the distance information in which the luminance values of pixels are set in accordance with the distance values. Higher luminance values indicate smaller distances and lower luminance values indicate larger distances. The circles represented by different grayscale values in the outline portion of the object A 21 in the distance image 22 before interpolation shown in FIG. 2B are schematically enlarged and the actual distance information can be acquired at the level of the pixels.

In the distance image 22 before interpolation in FIG. 2B, although it is possible to acquire the distance information on the outline portion of the object A 21, it is not possible to acquire the distance information on the inner area of the object A 21 with the contrast detection technology because the inner area has no pattern. In such a case, the interpolation process is performed to estimate the distance values in the inner area by using the distance information acquired in the outline portion. The interpolation process results in a distance image 23 after interpolation shown in FIG. 2C.

In the interpolation process, the object area is divided on the basis of a certain criterion. For example, it is effective to adopt a dividing method in which parts that are close to each other in the image and that have similar colors are grouped into one area. The use of this dividing method enables, for example, the area division in the unit of objects.

For example, the interpolation process can be performed in the following manner for the distance undefined region existing in an area, for example, set as one divided area.

It is assumed that a distance value $D(p)$ is smoothly varied in an image area in which a pixel attribute value $Y(p)$ is smoothly varied and the distance value $D(p)$ is discontinuously varied in an image area in which the pixel attribute value Y(p) is sharply varied in an original image resulting from capturing of an object, where the pixel attribute value Y(p) indicates the attribute value, such as the luminance or color, of a pixel p in the original image resulting from capturing of the object.

The distance value D(p) of the pixel p is estimated on the above assumption, where the pixel p is a pixel for which no distance information is acquired in the distance image before the interpolation.

It is also assumed that a distance value D(q) of a pixel q around the pixel p has been acquired before the interpolation. In other words, the pixel q corresponds to, for example, a pixel in the outline portion of the object A 21 in the distance image 22 before interpolation shown in FIG. 2B.

The distance value D(p) estimated for the pixel p can be approximated by linear addition of the distance value D(q) of the pixel q around the pixel p and a weight $w_{pq}$, as shown in Expression (A). "N(p)" denotes a collection of pixels around the pixel p.

$$\tilde{D}(p) \approx \sum_{q \in N(p)} w_{pq} D(q) \quad\quad (A)$$

In Expression (A), the weight $w_{pq}$ is a function that has a higher value with the decreasing difference between the pixel attribute value Y(p) of the pixel p and a pixel attribute value Y(q) of the pixel q in the original image resulting from capturing of the object. Each of the pixel attribute value Y(p) and the pixel attribute value Y(q) indicates, for example, a luminance value or a color. For example, Expression (B) in which normal distribution is assumed can be used to calculate the weight $w_{pq}$:

$$w_{pq} \propto e^{\frac{-(Y(p)-Y(q))^2}{2\sigma_p^2}} \quad\quad (B)$$

In Expression (B), $\sigma_p^2$ denotes the distribution of a value Y included in the collection N(p).

A one-dimensional vector in which the distance values other than the distance values of pixels for which the distance information is acquired in the distance image before the interpolation are set to zero, that is, a one-dimensional vector in which an estimated distance value D corresponding to each pixel in the distance undefined region where the distance information is not defined is set to zero is denoted by [vector b].

A one-dimensional vector in which the estimated distance value corresponding to each pixel in the distance undefined region where the distance information is not defined is calculated according to Expression (A) to set the distance information for all the pixels is denoted by [vector x]. When the image has a size of n pixels×m pixels, the number of pixels in the entire image is equal to n×m. The [vector x] is a one-dimensional vector in which the estimated distance values D for all the pixels of the number n×m are arranged.

The relationship between the vector x and the vector b can be represented by:

$$Ax = b \quad\quad (C)$$

where A denotes a square matrix that has a magnitude of (n×m)×(n×m) and that has the weight $w_{pq}$ as an element.

The estimated distance values for the entire image can be acquired by calculating the value of the vector x according to the following expression. An inverse matrix of the square matrix A can be numerically acquired by using, for example, a conjugate gradient method:

$$x = A^{-1} \cdot b \quad\quad (D)$$

The distance values of the distance undefined region inside the object area can be estimated by the interpolation process in the above manner to create the distance map and the distance image for the entire image.

SUMMARY OF THE INVENTION

As described above, the interpolation process can be performed for the distance undefined region where the distance values are undefined to complete the distance map and the distance image. However, a problem can be caused in, for example, a case in which another adjacent object B exits in an image in the interpolation process of the distance undefined region inside the area of an object A in the image.

For example, there is a case in which the object A is adjacent to the object B in an image that is captured by a camera but the distance between the object A and the camera is greatly different from the distance between the object B and the camera in the real space. In such a case, the distance information observed in the boundary of the object A in the image greatly differs from the distance information observed in the boundary of the object B in the image. When the inner area of the object A is to be interpolated by using the distance information observed on the outline of the object A in such a case, the distance information about the outline of the object B can possibly be used. Such processing can cause a major error in the result of the interpolation. Problems in the interpolation process will now be described with reference to FIG. 3.

Referring to FIG. 3, an image of an object A 31 and an image of an object B 32 are captured by a camera 30 to generate a distance image.

The rectangular object A 31 is far from the camera 30 and the triangle object B 32 is near the camera 30.

FIG. 4 includes diagrams showing the positional relationship between the object A 31 and the object B 32 on an XY plane, an XZ plane, and a ZY plane.

Referring to FIG. 4, X corresponds to the horizontal direction, Y corresponds to the vertical direction, and Z corresponds to the depth direction (=the distance from the camera).

The positions on the outline or pattern of each object detected in the image are recorded while the focus position of the lens of the camera 30 shown in FIG. 3 is being sequentially moved from a shortest distance to an infinite distance by using the contrast detection technology.

A distance map (distance image a) of observed distance values, shown in FIG. 5A, is created from edge information detected at the positions on the outlines of the objects in an initial state. Extracting only the object A 31 in the image results in a distance map (distance image b) shown in FIG. 5B. However, the distance map (distance image b) in FIG. 5B undesirably includes part of the distance information detected on the outline of the triangle object B 32 at the near side.

Performing the interpolation process to the area of the rectangular object A 31 at the back side by estimating the distance values in the distance undefined region according to Expression (A) in this state results in an erroneous interpolation result (distance image c) shown in FIG. 5C. The distance image in FIG. 5C undesirably includes an error area caused by application of the distance information about the object B 32.

A correct distance image that should be normally generated is a distance image d in FIG. 5D. However, performing the interpolation process based on the distance image b shown in FIG. 5B results in the erroneous distance image c in FIG. 5C.

The mixing of such erroneous distance information is caused by various reasons including the following:

The boundary of the object does not exactly coincide with the positions where the edge is detected.

The edge is detected both inside and outside the correct boundary of the object.

The boundary of the object is detected at positions extended inward and outward from the correct boundary of the object because of the characteristics of the differential filter. The edge detected outside the object can be mixed into an area that is adjacent to the object. However, it is generally difficult to locally determine which side of the edge corresponds to the inner side of the object.

For example, when a black object exists on a white background or a white object exists on a black background, it is not possible to determine which side of the edge corresponds to the inner side of the object. In order to resolve such a problem, a method of detecting a closed area to determine that the inner side of the closed area corresponds to the object area may be adopted. However, since it is not possible to process a perforated object with this method, this method is not practical.

When the edge of an object is detected, it is difficult to determine which side of the area divided by the detected edge the object exists at. Accordingly, it is also difficult to determine whether the observed distance values are arranged in the correct object area. As a result, it is difficult to accurately determine whether the observed distance values on the outline can be applied in the interpolation process of a specific area and the interpolation process can possibly be performed erroneously.

It is desirable to provide an image processing apparatus, an image processing method, an a program that are capable of realizing an interpolation process into which a reduced amount of erroneous distance information is mixed to generate a distance image with a high degree of accuracy.

According to an embodiment of the present invention, an image processing apparatus includes an outline distance estimating unit that acquires distance information on an outline portion of an area included in an image; an area dividing unit that divides an area included in an image on the basis of pixel attribute values; an area-plane estimating unit that estimates an area plane composing each area by using the distance information on the outline portion of each area resulting from the division in the area dividing unit to calculate an area-plane definitional equation; an abnormal data determining unit that compares the area plane calculated by the area-plane estimating unit with each coordinate position on a three-dimensional space indicated by the distance information acquired by the outline distance estimating unit to determine the distance information having a high degree of shift from the area plane to be abnormal data; and an area interpolating unit that estimates the distances inside the area by using the distance information resulting from removal of the abnormal data from the distance information acquired by the outline distance estimating unit.

The image processing apparatus may further include an abnormal data processing unit that holds the distance information that is determined to be the abnormal data for a first area included in the image by the abnormal data determining unit. The abnormal data determining unit may determine whether the data held in the abnormal data processing unit is the abnormal data on the basis of the degree of shift from the area plane in a second area in the determination of the abnormal data in the second area. If it is determined that the data held in the abnormal data processing unit is not the abnormal data for the second area, the area interpolating unit may apply the data held in the abnormal data processing unit to an interpolation process in the second area.

The area-plane estimating unit may calculate parameters a, b, c, and d in a plane definitional equation $ax+by+cz+d=0$ in an xyz three-dimensional space for a plane composing the area divided by the area dividing unit.

The area-plane estimating unit may calculate parameters a to h, k, and m in a curved-surface definitional equation $ax^2+by^2+cz^2+dxy+eyz+fzx+gx+hy+kz+m=0$ in an xyz three-dimensional space for a curved surface composing the area divided by the area dividing unit.

The area-plane estimating unit may calculate the area-plane definitional equation by using the distance information on the outline portion of the area by a least-squares method or a robust estimation method.

The area-plane estimating unit may create a histogram concerning the distance information on the area, may determine whether the created histogram includes only approximately the same distance data, and may determine the area plane composing the area to have the same distance if it is determined that the histogram includes only approximately the same distance data.

The abnormal data determining unit may compare the distance between the area plane calculated by the area-plane estimating unit and each coordinate position in the three-dimensional space of the distance information acquired by the outline distance estimating unit with a predetermined threshold value to determine the distance information having a distance larger than the threshold value to be the abnormal data.

The abnormal data determining unit may calculate an average value and a standard deviation of the distances between the area plane calculated by the area-plane estimating unit and the coordinate positions in the three-dimensional space of multiple pieces of distance information acquired by the outline distance estimating unit and may compare the difference between each piece of distance information and the average value with the standard deviation to find the abnormal data.

According to another embodiment of the present invention, an image processing method performed in an image processing apparatus includes the steps of acquiring distance information on an outline portion of an area included in an image by an outline distance estimating unit; dividing an area included in an image on the basis of pixel attribute values by an area dividing unit; estimating an area plane composing each area by using the distance information on the outline portion of each area resulting from the division in the area dividing unit to calculate an area-plane definitional equation by an area-plane estimating unit; comparing the area plane calculated by the area-plane estimating unit with each coordinate position on a three-dimensional space indicated by the distance information acquired by the outline distance estimating unit to determine the distance information having a high degree of shift from the area plane to be abnormal data by an abnormal data determining unit; and estimating the distances inside the area by using the distance information resulting from removal of the abnormal data from the distance information acquired by the outline distance estimating unit by an area interpolating unit.

According to another embodiment of the present invention, a program causes an image processing apparatus to perform image processing. The program includes the steps of causing an outline distance estimating unit to acquire distance information on an outline portion of an area included in an image; an area dividing unit to divide an area included in an image on the basis of pixel attribute values; an area-plane estimating unit to estimate an area plane composing each area by using the distance information on the outline portion of each area resulting from the division in the area dividing unit in order to calculate an area-plane definitional equation; an abnormal data determining unit to compare the area plane calculated by the area-plane estimating unit with each coordinate position on a three-dimensional space indicated by the distance information acquired by the outline distance estimating unit in order to determine the distance information having a high degree of shift from the area plane to be abnormal data; and an area interpolating unit to estimate the distances inside the area by using the distance information resulting from removal of the abnormal data from the distance information acquired by the outline distance estimating unit.

The program according to the embodiment of the present invention is a computer-readable program that can be supplied from a recording medium or a communication medium to an image processing apparatus or a computer system capable of executing a variety of program code. Supplying the computer-readable program allows a process corresponding to the program to be realized in the image processing apparatus or the computer system.

Further features and advantages of the present invention will become apparent from the following description of exemplary embodiments with reference to the attached drawings. The system in this specification is a logical collection of multiple apparatuses and is not limited to components incorporated in the same housing.

According to embodiments of the present invention, a configuration is adopted in which the distance information on the outline area of an area included in an image is acquired by, for example, the contrast detection technology and the distance values in the region in the area where the distance information is not acquired are estimated. In the above configuration, an area-plane definitional equation to define an area plane, such as a plane, composing the area by using the distance information on the outline area of the area is calculated. An area interpolation process is performed in which the calculated area plane is compared with each coordinate position in the three-dimensional space indicated by the distance information, the distance information having a high degree of shift from the area plane is determined to be the abnormal data, and the distance information resulting from the removal of the abnormal data is applied to estimate the distances inside the area. This process allows an occurrence of an interpolation error caused by application of the abnormal data to be prevented to generate a distance image with a high degree of accuracy.

BRIEF DESCRIPTION OF THE DRAWINGS

FIG. 1 shows an example of a distance image;

FIG. 3 is a diagram illustrating how an interpolation process error occurs when multiple objects exist;

FIG. 4 includes diagrams illustrating how an interpolation process error occurs when multiple objects exist;

FIG. 6 illustrates an outline of image processing according to embodiments of the present invention;

FIG. 9 shows an example of outline distance information generated by the image processing apparatus according to the first embodiment of the present invention;

FIG. 10 shows an example of area information generated by the image processing apparatus according to the first embodiment of the present invention;

FIGS. 11A to 11C show an example of how to determine abnormal data in the image processing apparatus according to the first embodiment of the present invention;

FIG. 14 is a block diagram showing an example of the configuration of an image processing apparatus according to a second embodiment of the present invention; and FIG. 15 is a flowchart showing an example of a process performed by the image processing apparatus according to the second embodiment of the present invention.

DESCRIPTION OF THE PREFERRED EMBODIMENTS

An image processing apparatus, an image processing method, and a program according to embodiments of the present invention will herein be described in detail with reference to the attached drawings.

1. Outline of Image Processing in Embodiments of the Present Invention

An outline of image processing in embodiments of the present invention will now be described with reference to FIGS. 6 and 7.

In the embodiments of the present invention, an interpolation process in which specific distance information acquired near an edge, for example, on the boundary of an object is used to estimate the distances in the distance undefined region is performed to generate a distance image.

Before start of the interpolation process, an equation to define the plane of the object to be subjected to the interpolation process (such an equation is hereinafter referred to as a plane definitional equation) is calculated and the distance information that is greatly shifted from the plane definitional equation is determined to be abnormal data to remove the abnormal data. Only the remaining normal data, that is, only the normal distance information that is determined to correspond to the object including the plane defined by the plane definitional equation is used to perform the interpolation process to the inner area of the plane.

For example, as in an example shown in FIG. 6, an image of an object A 101 and an image of an object B 102, which are captured by a camera 100, are applied to acquire the distance information with the contrast detection technology. The distance between the object A 101 and the camera 100 is different from the distance between the object B 102 and the camera 100.

In the interpolation process of the inner area of the object A 101, a plane definitional equation S: $ax+by+cz+d=0$ of the object A 101 shown in FIG. 6 is calculated.

An initial distance image has the distance information only on the outline of the object, as described above. FIG. 7A shows an initial distance image a having the distance information only on the outline of the object A 101. Although only the object A 101 is shown in FIG. 7A, not only the distance information corresponding to the distance to the object A 101 but also the distance information based on the boundary of the object B 102 exist on the boundary of the object A 101.

The image processing apparatuses according to the embodiments of the present invention determine the distance information based on the boundary of the object B 102 to be the abnormal data to remove the abnormal data.

Before start of the interpolation process, the plane definitional equation [S: $ax+by+cz+d=0$] defining the plane of the object A 101 to be subjected to the interpolation process is calculated and the distance information that is greatly shifted from the plane definitional equation is determined to be the abnormal data to remove the abnormal data.

Figure 2C:
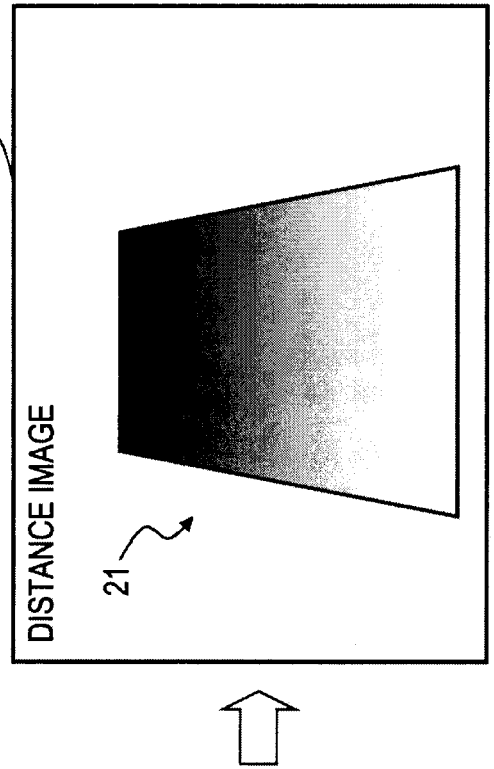
FIGS. 2A to 2C show an example of how to generate a distance image by a contrast detection technology.
Figure 2A:
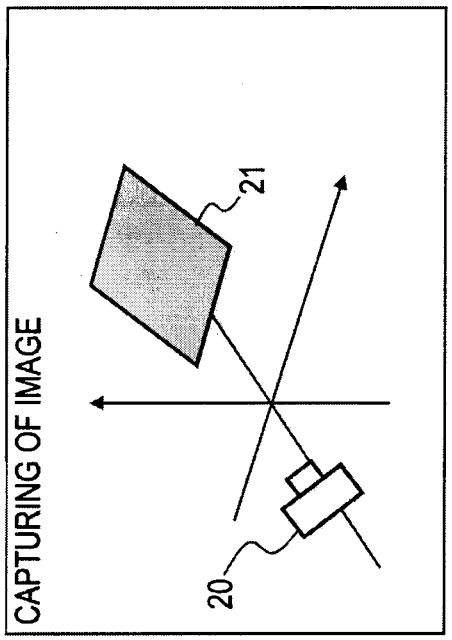
Figure 2B:
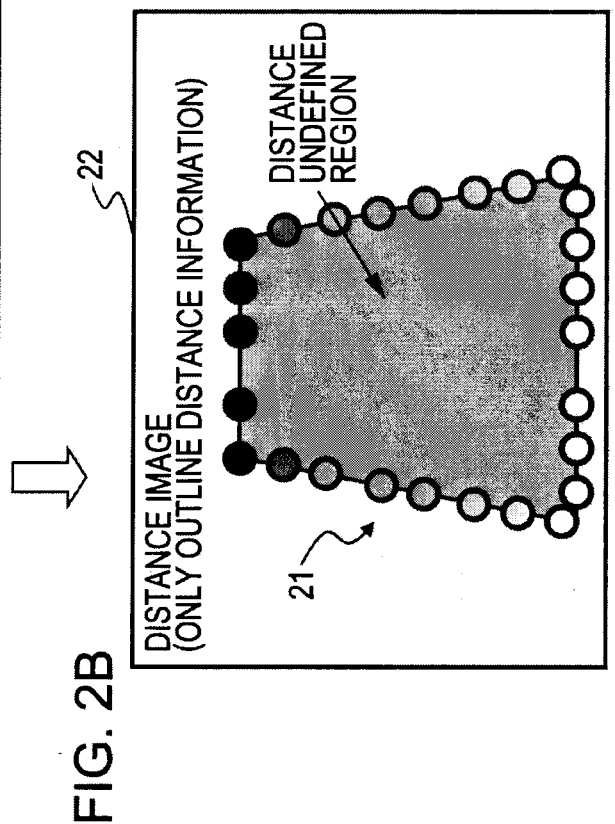
Figure 5A:
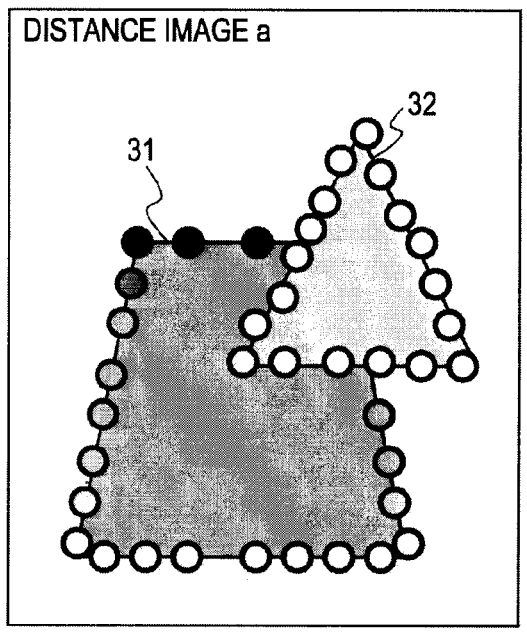
FIGS. 5A to 5D are diagrams illustrating how an interpolation process error occurs when multiple objects exist.
Figure 5B:
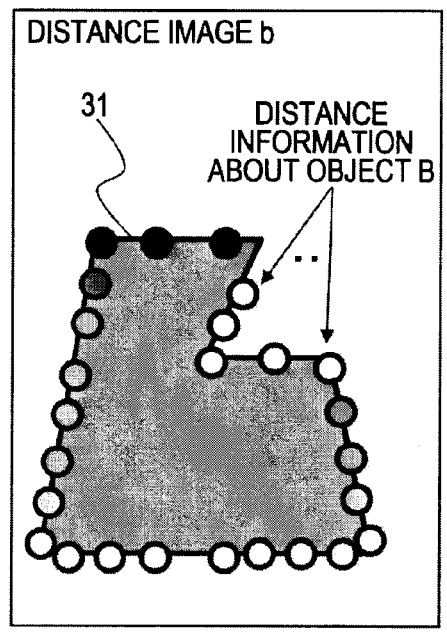
Figure 5C:
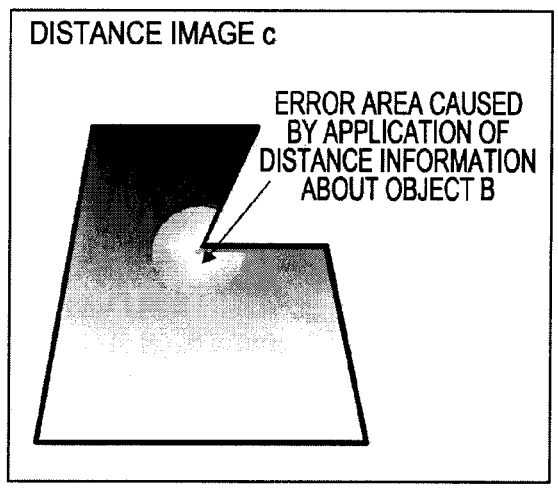
Figure 5D:
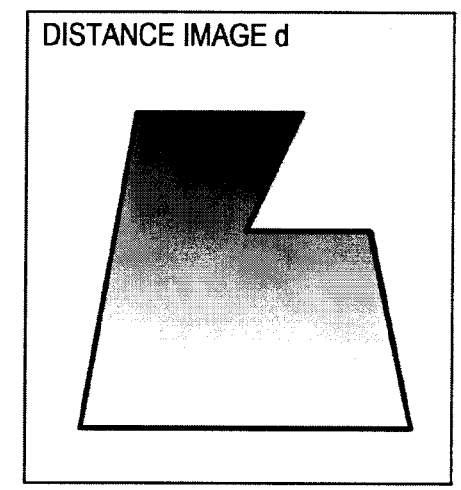
Figure 7B:
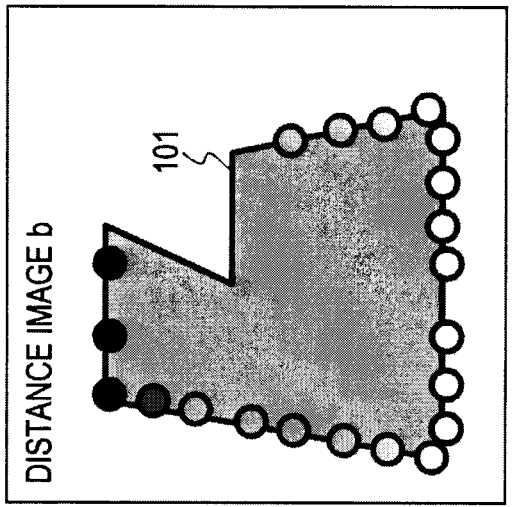
FIGS. 7A to 7C illustrate an outline of the image processing according to the embodiments of the present invention.
Figure 7C:
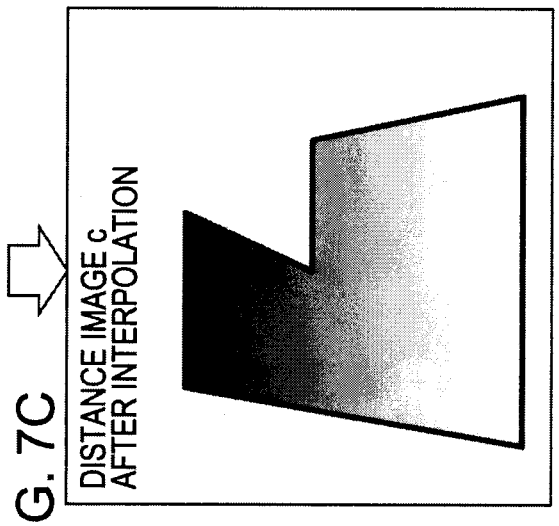
Figure 7A:
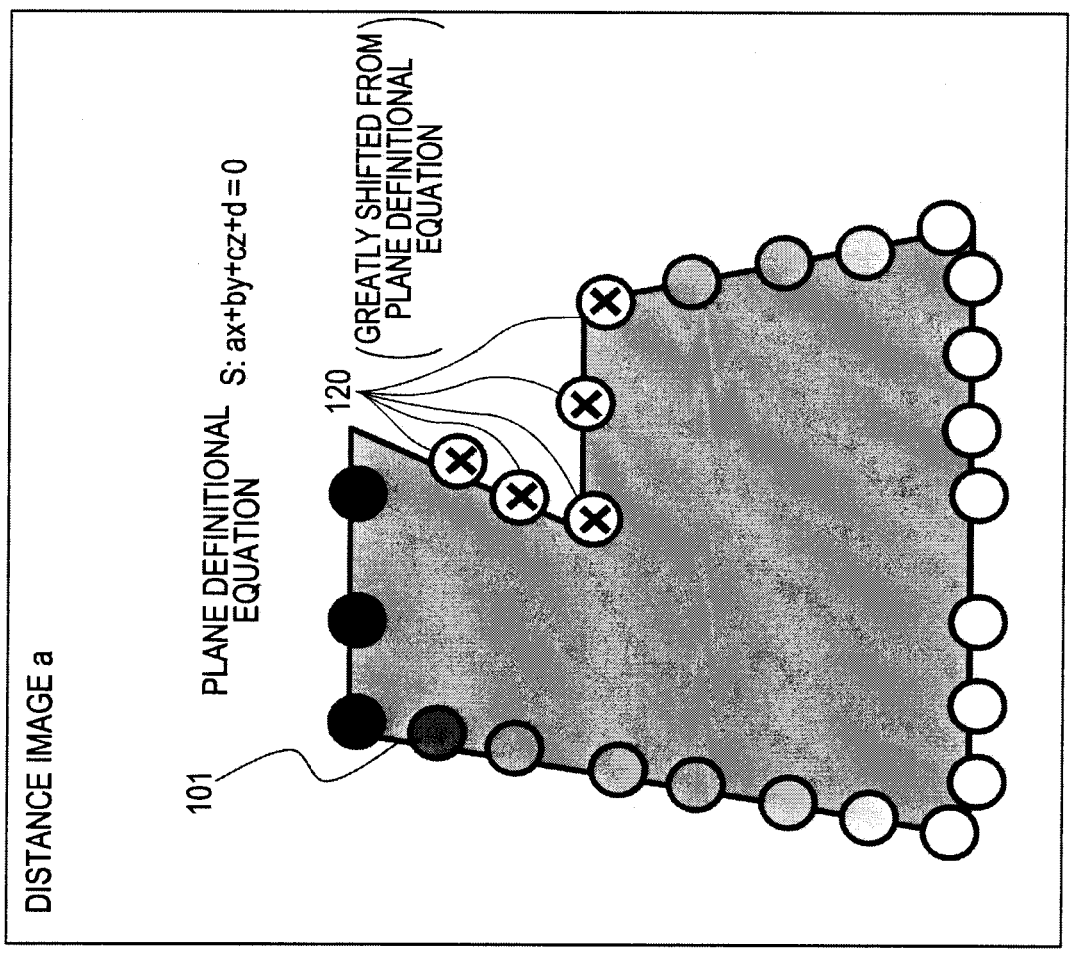

As a result, abnormal data 120 shown in FIG. 7A is removed to provide a distance image b shown in FIG. 7B, in which only the normal distance information corresponding to the object A 101 is selected. The distance information b is applied to perform the interpolation process.

The interpolation process results in a distance image c shown in FIG. 7C. Since only the distance information about the object A 101 on the boundary of the object A 101 is selectively used to estimate the distances in the inner area of the object A 101 in the distance image c, the distance image c is composed of the correct distance information.

As described above, the image processing apparatuses according to the embodiments of the present invention are capable of calculating the plane definitional equation defining the plane of the object to be subjected to the interpolation process before start of the interpolation process, determining the distance information that is greatly shifted from the plane definitional equation to be the abnormal data to remove the abnormal data, and performing the interpolation process to which only the normal data is applied to generate the correct distance image including no error.

2. Image Processing Apparatus According to First Embodiment

An image processing apparatus according to a first embodiment of the present invention will now be described with reference to FIGS. 8 to 13.

Figure 8:
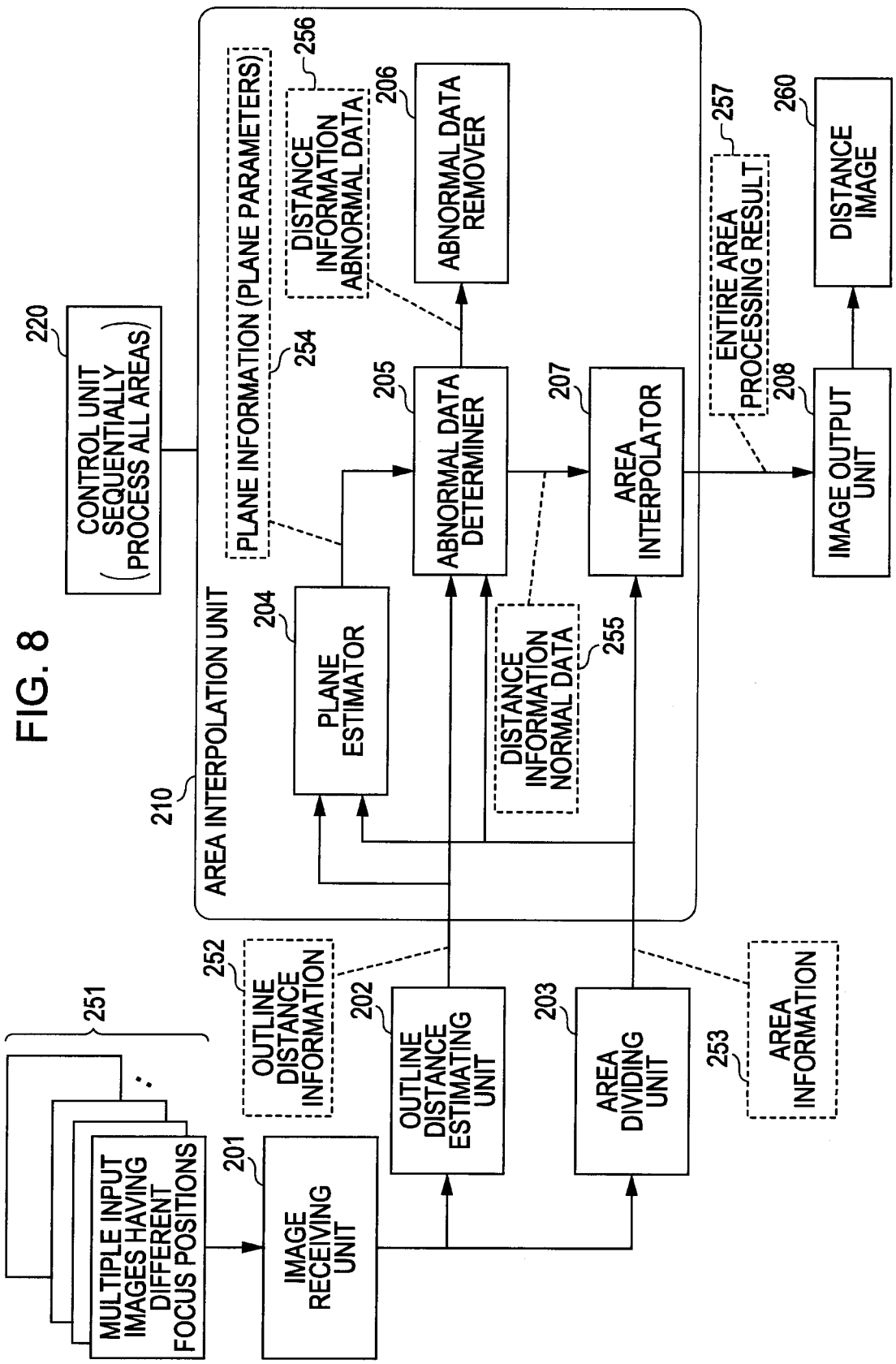
FIG. 8 is a block diagram showing an example of the configuration of an image processing apparatus according to a first embodiment of the present invention.

FIG. 8 is a block diagram showing an example of the configuration of the image processing apparatus according to the first embodiment of the present invention. Referring to FIG. 8, the image processing apparatus includes an image receiving unit 201, an outline distance estimating unit 202, an area dividing unit 203, an area interpolation unit 210, an image output unit 208, and a control unit 220. The area interpolation unit 210 includes a plane estimator 204, an abnormal data determiner 205, an abnormal data remover 206, and an area interpolator 207. The components in the image processing apparatus perform processes in accordance with, for example, programs executed by the control unit 220.

The image receiving unit 201 receives images captured by a camera (not shown). Input images 251 are captured while the focus position of the lens of the camera is being sequentially moved from a shortest distance to an infinite distance.

The outline distance estimating unit 202 detects the peaks in the variation in luminance with the edge detection filter to acquire the focus distances of the points that are, for example, on the outline or pattern of each object and that correspond to pixels where the variation in luminance is maximized as the distance information about the pixels. Specifically, the outline distance estimating unit 202 acquires outline distance information 252 shown in FIG. 9 to supply the acquired outline distance information 252 to the plane estimator 204 and the abnormal data determiner 205 in the area interpolation unit 210.

The outline distance information 252 in FIG. 9 is data having the distance information, for example, only on the outline portion or the boundary of the pattern of each object. It is assumed in the first embodiment that both the object A 101 and the object B 102 have no pattern and the distance information about the inner areas of the objects is not acquired by the contrast detection technology.

Referring back to FIG. 8, the area dividing unit 203 divides the object area on the basis of the input images. The area dividing unit 203 processes each area having similar pixel values in the image as one object. For example, parts that are close to each other in the image and that have similar colors are determined to belong to the same object. For example, area information 253 shown in FIG. 10 is generated as the result of the area division in the area dividing unit 203.

The area information 253 in FIG. 10 has information about an area A 281 and an area B 282. The area A 281 corresponds to the object A 101 and the area B 282 corresponds to the object B 102.

The area information 253 generated by the area dividing unit 203 is supplied to the plane estimator 204, the abnormal data determiner 205, and the area interpolator 207 in the area interpolation unit 210.

Processes in the area interpolation unit 210 will be described. The area interpolation unit 210 performs the interpolation process in units of areas set by the area dividing unit 203 under the control of the control unit 220.

A process performed by the plane estimator 204 in the area interpolation unit 210 will now be described.

The plane estimator 204 calculates the plane definitional equation in units of areas divided by the area dividing unit 203. For example, when the plane estimator 204 receives the area information 253 shown in FIG. 10, the plane estimator 204 sequentially calculates the plane definitional equations concerning the area A 281 and the area B 282. An example of how to calculate the plane definitional equation of the area A 281 corresponding to the object A 101 will now be described.

The plane estimator 204 also receives the outline distance information 252 (refer to FIG. 9) generated by the outline distance estimating unit 202. The outline distance information 252 generated by the outline distance estimating unit 202 includes information about a space coordinate (x,y,z) in which the distance information is represented by the z coordinate, in addition to information about a plane coordinate (x,y) of the edge (outline) portion. The plane estimator 204 uses the coordination information to calculate the plane definitional equation of the area corresponding to a specific object.

The outline distance information 252 (refer to FIG. 9) generated by the outline distance estimating unit 202 includes multiple pieces of coordinate information $(x1,y1,z1)$ to $(xn,yn,zn)$ on the outline portion of the plane composing the object A 101. Although part of the pieces of coordinate information $(x1,y1,z1)$ to $(xn,yn,zn)$ belongs to the object B 102, the majority thereof belongs to the object A 101.

The multiple known coordinates are used to detect one plane on which the known coordinates are set. Such a plane can be calculated by several methods. For example, a least-squares method or a robust estimation method may be used to calculate the plane definitional equation. A process using the least-squares method is exemplified here.

In the case of an area whose approximate plane can be determined by a specific method, the distance data on the entire inner area may be determined. Specifically, a histogram of the distance data included in the area is created and, if it is determined that the histogram includes only approximately the same distance data, the entire area is determined to have the distance data that is representative of the histogram. For example, if the data is concentrated in a specific range of the distance data at a proportion that is higher than a predetermined threshold value, the concentrated distance data is determined to represent the distances of the entire area. With the above method, the estimation of the approximate plane of the area and the interpolation of the distance undefined region in the area, described below, can be omitted to reduce the amount of calculation.

An example of how to calculate the plane definitional equation by the least-squares method will now be described. In the least-squares method, parameters causing the sum of the squares of the residual to be minimized are calculated when a data sequence that has been observed is approximated with an assumed function.

The plane definitional equation in the xyz space of a target area to be processed is defined according to Expression 1:

$$S: ax + by + cz + d = 0 \qquad (1)$$

where $a^2 + b^2 + c^2 = 1$.

The plane estimator 204 calculates unknown parameters a, b, c, and d in the plane definitional equation S in the following manner.

Rewriting Expression (1) with respect to "z" results in Expression (2):

$$z = -\frac{a}{c}x - \frac{b}{c}y - \frac{d}{c} = a_1 x + a_2 y + a_3 \qquad (2)$$

The relationship with the observed n-number data sequences (x1,y1,z1), (x2,y2,z2), ..., (xn,yn,zn) is represented by using matrices. The observed n-number data sequences (x1,y1,z1) to (xn,yn,zn) are information included in the outline distance information 252 (refer to FIG. 9) generated by the outline distance estimating unit 202 and are n-number pieces of coordinate information on the outline portion of the plane composing the object A 101. In Expression (2), values x and y are represented by a matrix G; values a1, a2, and a3 are represented by a matrix a; and a value z is represented by a matrix z. Specifically, the values in Expression (2) are represented according to Expression (3):

$$G = \begin{pmatrix} x_1 & y_1 & 1 \\ x_2 & y_2 & 1 \\ \vdots & & \\ x_n & y_n & 1 \end{pmatrix}, a = \begin{pmatrix} a_1 \\ a_2 \\ a_3 \end{pmatrix} = \begin{pmatrix} -\frac{a}{c} \\ -\frac{b}{c} \\ -\frac{d}{c} \end{pmatrix}, z = \begin{pmatrix} z_1 \\ z_2 \\ \vdots \\ z_n \end{pmatrix} \qquad (3)$$

If all of the observed n-number data sequences (x1,y1,z1) to (xn,yn,zn) are completely on the plane S and the residual is equal to zero, Expression (4) is established:

$$Ga = z \qquad (4)$$

However, the sum J of squares of the residual represented by Expression (5) practically exists between the observed values and the logical values on the plane S:

$$J = (Ga - z)^T (Ga - z) \qquad (5)$$

A parameter vector a of the least squares plane S causing the sum J of squares of the residual to be minimized is calculated by solving the following normal equation (6) in which the sum J of squares of the residual in Expression (5) is subjected to partial differentiation with each component of the parameter vector a to set the sum J of squares of the residual to zero:

$$G^T G a = G^T z \qquad (6)$$

Expanding Expression (6) results in Expression (7):

$$a = (G^T G)^{-1} G^T z \qquad (7)$$

where the matrix $G^T G$ is represented by Expression (8):

$$G^T G = \begin{pmatrix} x_1 & x_2 & x_3 & \ldots & x_n \\ y_1 & y_2 & y_3 & \ldots & y_n \\ 1 & 1 & 1 & \ldots & 1 \end{pmatrix} \begin{pmatrix} x_1 & y_1 & 1 \\ x_2 & y_2 & 1 \\ x_3 & y_3 & 1 \\ \vdots & & 1 \\ x_n & y_n & 1 \end{pmatrix} \qquad (8)$$

$$= \begin{pmatrix} \sum x_i^2 & \sum x_i y_i & \sum x_i \\ \sum x_i y_i & \sum y_i^2 & \sum y_i \\ \sum x_i & \sum y_i & n \end{pmatrix}$$

$$= \begin{pmatrix} p_{11} & p_{12} & p_{13} \\ p_{21} & p_{22} & p_{23} \\ p_{31} & p_{32} & p_{33} \end{pmatrix}$$

$$= P$$

A symbol Σ indicates the sum of the values when i=1, ..., n.

Except a special case in which the observed data sequences are degenerated to one point or a straight line, an inverse matrix of P exists. An inverse matrix $P^{-1}$ of a 3×3 matrix is algebraically calculated according to Expression (9):

$$\det P = p_{11} p_{22} p_{33} + p_{21} p_{32} p_{13} + \qquad (9)$$
$$p_{31} p_{12} p_{23} - p_{11} p_{32} p_{23} - p_{31} p_{22} p_{13} - p_{21} p_{12} p_{33}$$

$$P^{-1} = \frac{1}{\det P} \begin{pmatrix} p_{22} p_{33} - p_{23} p_{32} & p_{13} p_{32} - p_{12} p_{33} & p_{12} p_{23} - p_{13} p_{22} \\ p_{23} p_{31} - p_{21} p_{33} & p_{11} p_{33} - p_{13} p_{31} & p_{13} p_{21} - p_{11} p_{23} \\ p_{21} p_{32} - p_{22} p_{31} & p_{12} p_{31} - p_{11} p_{32} & p_{11} p_{22} - p_{12} p_{21} \end{pmatrix}$$

The matrix $G^T z$ is represented by Expression (10):

$$G^T z = \begin{pmatrix} x_1 & x_2 & x_3 & \ldots & x_n \\ y_1 & y_2 & y_3 & \ldots & y_n \\ 1 & 1 & 1 & \ldots & 1 \end{pmatrix} \begin{pmatrix} z_1 \\ z_2 \\ z_3 \\ \vdots \\ z_n \end{pmatrix} \qquad (10)$$

$$= \begin{pmatrix} \sum x_i z_i \\ \sum y_i z_i \\ \sum z_i \end{pmatrix}$$

$$= \begin{pmatrix} q_1 \\ q_2 \\ q_3 \end{pmatrix}$$

$$= q$$

The matrix a is represented by Expression (11) from Expressions (7) to (9):

$$a = (G^T G)^{-1} G^T z = P^{-1} q \qquad (11)$$

The elements $a_1$, $a_2$, $a_3$ in the matrix a are calculated according to Expression (12):

$$a_1 = \frac{\left(\begin{array}{c} p_{22}p_{33} - \\ p_{23}p_{32} \end{array}\right) q_1 + \left(\begin{array}{c} p_{13}p_{32} - \\ p_{12}p_{33} \end{array}\right) q_2 + \left(\begin{array}{c} p_{12}p_{23} - \\ p_{13}p_{22} \end{array}\right) q_3}{\det P} \qquad (12)$$

$$a_2 = \frac{\left(\begin{array}{c} p_{23}p_{31} - \\ p_{21}p_{33} \end{array}\right) q_1 + \left(\begin{array}{c} p_{11}p_{33} - \\ p_{13}p_{31} \end{array}\right) q_2 + \left(\begin{array}{c} p_{13}p_{21} - \\ p_{11}p_{23} \end{array}\right) q_3}{\det P}$$

$$a_3 = \frac{\left(\begin{array}{c} p_{21}p_{32} - \\ p_{22}p_{31} \end{array}\right) q_1 + \left(\begin{array}{c} p_{12}p_{31} - \\ p_{11}p_{32} \end{array}\right) q_2 + \left(\begin{array}{c} p_{11}p_{22} - \\ p_{12}p_{21} \end{array}\right) q_3}{\det P}$$

The elements $a_1$, $a_2$, and $a_3$ in the matrix a have the relationship according to Expression (13) with the parameters a, b, c, and d in the plane definitional equation S: ax+by+cz+d=0, as shown above in Expression (3):

$$a_1 = -(a/c)$$

$$a_2 = -(b/c)$$

$$a_3 = -(d/c) \qquad (13)$$

The parameters a, b, c, and d in the plane definitional equation S are determined according to the relational expression (13).

A vector (a,b,c) is a normal vector of the plane S and may have an arbitrary magnitude. The magnitude of the vector (a,b,c) is set to one here. The parameter c is expressed according to Expression (14):

$$a^2 + b^2 + c^2 = 1 \qquad (14)$$

$$c = \sqrt{1 - a^2 - b^2}$$

Accordingly, the parameter a, b, c, and d in the plane definitional equation S are expressed according to Expression (15):

$$a = \pm \frac{a_1}{\sqrt{a_1^2 + a_2^2 + 1}} \qquad (15)$$

$$b = \pm \frac{a_2}{\sqrt{a_1^2 + a_2^2 + 1}}$$

$$c = \mp \frac{1}{\sqrt{a_1^2 + a_2^2 + 1}}$$

$$d = \pm \frac{a_3}{\sqrt{a_1^2 + a_2^2 + 1}}$$

Since it is not necessary to discriminate between the front side and the back side of the plane, either the plus sign or the minus sign may be used.

The plane definitional equation S: ax+by+cz+d=0 is determined from the plane parameters a, b, c, and d calculated in the above manner.

The plane definitional equation S defines, for example, the plane of the object A 101 shown in FIGS. 6 and 7 (the area A 281 in FIG. 10).

The plane estimator 204 in FIG. 8 supplies plane information 254 including the plane parameters a, b, c, and d or the plane definitional equation S to the abnormal data determiner 205.

The abnormal data determiner 205 selects the abnormal data from the outline distance information 252 shown in FIG. 9, generated by the outline distance estimating unit 202. Since the target of the processing is the object A 101 shown in FIGS. 6 and 7 (the area A 281 in FIG. 10), the abnormal data determiner 205 selects the abnormal data corresponding to the object A 101 (the area A 281).

An example of how the abnormal data determiner 205 determines the abnormal data will now be described with reference to FIGS. 11A to 11C.

FIG. 11A shows the object A 101 and the object B 102 on the yz plane. The z coordinate corresponds to the distance from the camera.

The plane of the object A 101 is indicated as the plane definitional equation S: ax+by+cz+d=0 calculated by the plane estimator 204.

Circles represented by different grayscale values in FIG. 11A indicate the outline distance information 252 generated by the outline distance estimating unit 202. The outline distance information 252 has pieces of three-dimensional position information (x1,y1,z1) to (xn,yn,zn).

The distance between the plane definitional equation S: az+by+cz+d=0 and each of the positions (x1,y1,z1) to (xn,yn,zn) included in the outline distance information generated by the outline distance estimating unit 202 is calculated.

For example, a distance $d_i$, between the i-th three-dimensional position data (xi,yi,zi) and the plane S is represented by Expression (16):

$$d_i = \frac{|ax_i + by_i + cz_i + d|}{\sqrt{a^2 + b^2 + c^2}} = |ax_i + by_i + cz_i + d| \qquad (16)$$

It is determined that a piece of data having the distance $d_1$ from the plane S, which is considerably larger than those of the other pieces of data, is the abnormal data and such a piece of data possibly does not belong to the area. This determination may be based on comparison with a predetermined threshold value Th. If the data has the distance $d_i$ from the plane S larger than the threshold value Th, the data is determined to be the abnormal data. In other words, if Expression (17) is established, the data is determined to be the abnormal data:

$$di > Th \qquad (17)$$

The distance information on the object B 102 shown in FIG. 11A is determined to be abnormal data 291.

Alternatively, a method may be adopted, in which the average value of the distances between the plane of the area and all of the pieces of data (x1,y1,z1) to (xn,yn,zn) acquired as the outline distance information is calculated, the difference between the average value and each distance $d_i$, is calculated, and the calculated difference data is compared with a standard deviation σ of the distances to determine the abnormal data.

When the abnormal data is determined on the basis of the comparison with the standard deviation σ, the i-th data is determined to be the abnormal data if Expression (18) is established:

$$|\bar{d} - d_i| > 2\sigma$$

where $\bar{d}$ denotes the average value of the distance di.

$$\sigma = \sqrt{\frac{1}{n-1}\sum_{i=1}^{n}(d_i - \overline{d})^2} \quad (18)$$

As described above, the average value of the distances between the plane of the area and the coordinate positions on the three-dimensional space, indicated by the multiple pieces of distance information acquired by the outline distance estimating unit, and the standard deviation may be calculated, and the difference between each piece of distance information and the average value may be compared with the standard deviation to find the abnormal data.

In the process of determining the abnormal data in the abnormal data determiner 205, for example, the abnormal data is determined from the pieces of position information (x1,y1,z1) to (xn,yn,zn) included in the outline distance information generated by the outline distance estimating unit 202 in the above manner.

As shown in FIG. 8, the abnormal data determiner 205 supplies distance information normal data 255 to the area interpolator 207. The distance information normal data 255 results from selection of only the normal data from the pieces of position information (x1,y1,z1) to (xn,yn,zn) included in the outline distance information by the process of determining the abnormal data. In addition, the abnormal data determiner 205 supplies distance information abnormal data 256 including only the abnormal data to the abnormal data remover 206.

An initial distance image shown in FIG. 11B corresponds to the outline distance information 252 generated by the outline distance estimating unit 202. The initial distance image in FIG. 11B includes all of the pieces of data (x1,y1,z1) to (xn,yn,zn) acquired as the outline distance information.

The abnormal data determiner 205 selects only the normal data from the pieces of position information (x1,y1,z1) to (xn,yn,zn) included in the outline distance information by the process of determining the abnormal data. As a result, a distance image after the removal of the abnormal data shown in FIG. 11C resulting from the removal of the abnormal data is generated and is supplied to the area interpolator 207.

The abnormal data remover 206 removes the distance information abnormal data 256.

The area interpolator 207 uses the distance information normal data 255 resulting from the selection of only the normal data from the pieces of position information (x1,y1, z1) to (xn,yn,zn) included in the outline distance information to perform the interpolation process.

Figure 12B:
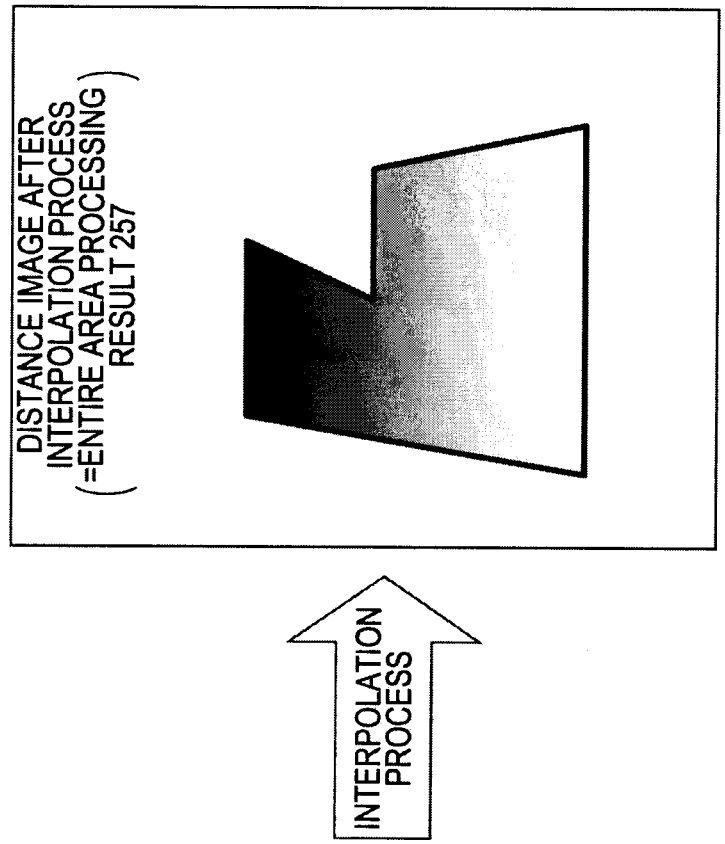
FIGS. 12A to 12B show an example of how to perform an interpolation process in an area interpolator in the image processing apparatus according to the first embodiment of the present invention.
Figure 12A:
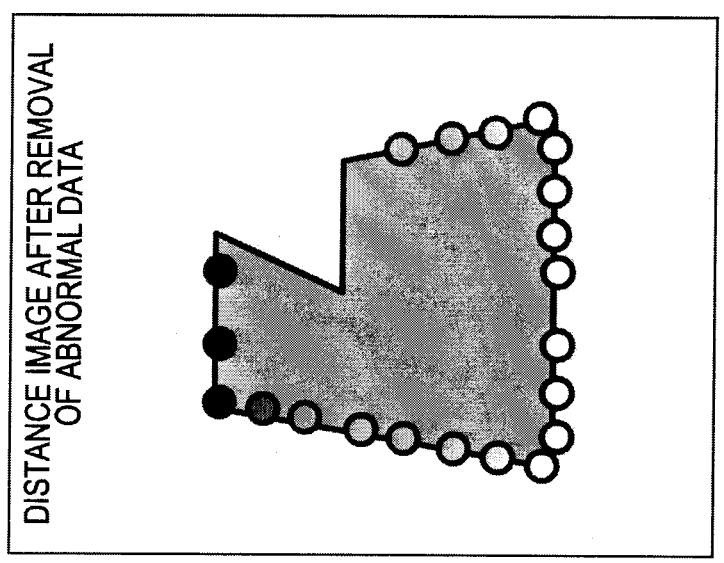

FIGS. 12A and 12B show an example of how to perform the process in the area interpolator 207. The area interpolator 207 uses only the distance information normal data included in the distance image after the removal of the abnormal data shown in FIG. 12A resulting from the removal of the abnormal data in the abnormal data determiner 205 to perform the interpolation process to the distance undefined region in the object A 101.

The interpolation process can be performed according to Expression (A) described above.

In the interpolation process, the abnormal data is not used and only the distance information on the outline all of which belongs to the object A 101 is used. As a result, the interpolation process is correctly performed without the error area and a correct distance image after the interpolation process shown in FIG. 12B is generated.

As shown in FIG. 8, the correct distance image after the interpolation process shown in FIG. 12B is supplied to the image output unit 208 as an entire area processing result 257 and a correct distance image 260 is output from the image output unit 208.

As described above, the image processing apparatus according to the first embodiment of the present invention divides each area included in an image in accordance with the pixel attribute values, such as the luminance values or the colors, calculates the plane for every area, and determines the distance information shifted from the calculated plane to be the abnormal data to remove the abnormal data.

Then, the image processing apparatus performs the interpolation process in which the distance information composed of only the normal data resulting from the removal of the abnormal data is used to estimate the distances in the distance undefined region in the area.

The above process results in the accurate distance image without any error caused by the abnormal data.

Although the calculation of the plane of only the object A 101 (the area A 281) and the interpolation process are described above, the calculation of the plane of the object B 102 (the area B 282) and the interpolation process are performed after the object A 101 (the area A 281) has been processed.

Figure 13:
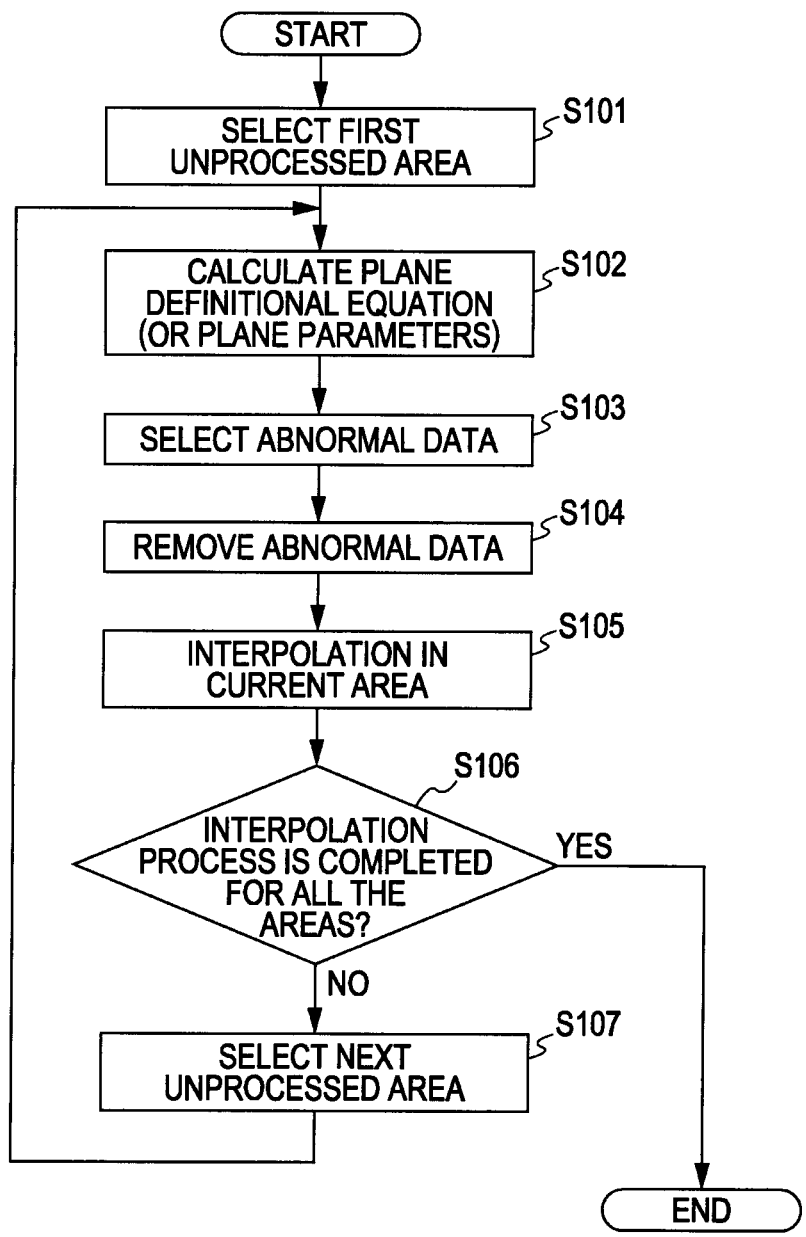
FIG. 13 is a flowchart showing an example of a process performed by the image processing apparatus according to the first embodiment of the present invention.

FIG. 13 is a flowchart showing an example of a process according to the first embodiment of the present invention. The process in FIG. 13 is performed after the outline distance information 252 (refer to FIG. 9) has been generated in the outline distance estimating unit 202 in FIG. 8 and the area information 253 (refer to FIG. 10) has been generated in the area dividing unit 203 in FIG. 8. Specifically, the process in FIG. 13 is performed by the area interpolation unit 210 in FIG. 8. As described above, the area interpolation unit 210 performs the interpolation process in units of areas set by the area dividing unit 203 under the control of the control unit 220.

Referring to FIG. 13, in Step S101, the control unit 220 in FIG. 8 refers to the area information 253 (refer to FIG. 10) in the area dividing unit 203 to select one unprocessed area for which the interpolation process is not performed.

In Step S102, the plane estimator 204 in FIG. 8 calculates the plane definitional equation or the plane parameters corresponding to the selected area. This step is performed by using information about the space coordinate (x,y,z) resulting from the addition of the distance information (z coordinate) to the plane coordinate (x,y) of the edge (outline) portion included in the outline distance information 252 generated by the outline distance estimating unit 202, as described above.

The plane definitional equation is calculated by using the multiple pieces of coordinate information (x1,y1,z1) to (xn, yn,zn) on the outline portion of the area by, for example, the least-squares method or the robust estimation method.

Specifically, the parameters a, b, c, and d in the plane definitional equation S: ax+by+cz+d=0 of the area are calculated.

As described above, in the case of an area whose approximate plane can be determined by a specific method other than the least-squares method and the robust estimation method, the distance data on the entire inner area may be determined. Specifically, a histogram of the distance data included in the area is created and, if it is determined that the histogram includes only approximately the same distance data, the entire area is determined to have the distance data that is representative of the histogram. When the plane is estimated by the above process, the interpolation of the distance undefined region in the area (Step S105) can be omitted to reduce the amount of calculation.

In Step S103, the abnormal data determiner 205 in FIG. 8 selects the abnormal data from the outline distance information 252 shown in FIG. 9 generated by the outline distance estimating unit 202. The process of determining the abnormal data in the abnormal data determiner 205 is performed in the manner described above with reference to FIGS. 11A to 11C.

As shown in FIG. 11A, the distance between the plane represented by the plane definitional equation S and each of the pieces of three-dimensional position information (x1,y1,z1) to (xn,yn,zn) included in the outline distance information 252 generated by the outline distance estimating unit 202 is calculated.

For example, a piece of data having the distance $d_i$, between the i-th three-dimensional position data (xi,yi,zi) and the plane S, which is considerably larger than those of the other pieces of data, is determined to be the abnormal data. In other words, it is determined that such a piece of data is the distance information that does not belong to the target area.

Specifically, the comparison with the predetermined threshold value Th may be performed to determine the abnormal data. Alternatively, the average value of the distances between the plane of the area and all the pieces of data (x1,y1,z1) to (xn,yn,zn) acquired as the outline distance information may be calculated, the difference between the average value and each distance $d_i$ may be calculated, and the calculated difference data may be compared with the standard deviation σ of the distances to determine the abnormal data.

In Step S104, the abnormal data remover 206 in FIG. 8 removes the distance information abnormal data determined to be the abnormal data by the abnormal data determiner 205.

In Step S105, the area interpolator 207 in FIG. 8 uses the distance information normal data resulting from the selection of only the normal data from the pieces of position information (x1,y1,z1) to (xn,yn,zn) included in the outline distance information to perform the interpolation process.

This step is performed in the manner described above with reference to FIGS. 12A and 12B. The area interpolator 207 uses only the distance information normal data included in the distance image after the removal of the abnormal data shown in FIG. 12A resulting from the removal of the abnormal data in the abnormal data determiner 205 to perform the interpolation process to the distance undefined region in the target area (the object A 101). The interpolation process can be performed according to Expression (A) described above.

In the interpolation process, the abnormal data is not used and only the distance information on the outline all of which belongs to the single object A 101 is used. As a result, the interpolation process is correctly performed without the error area and the correct distance image after the interpolation process shown in FIG. 12B is generated.

In Step S106, the control unit 220 determines whether the interpolation process is completed for all the areas. All the areas mean all areas included in the area information 253 (refer to FIG. 10) in the area dividing unit 203.

If the control unit 220 determines that the interpolation process is not completed for all the areas and any unprocessed area remains (No in Step S106), then in Step S107, the control unit 220 selects one unprocessed area. Then, the process goes back to Step S102 to repeat the steps.

If the control unit 220 determines that the interpolation process is completed for all the areas (Yes in Step S106), the process in FIG. 13 is terminated.

As described above, the image processing apparatus according to the first embodiment of the present invention performs the interpolation process in which the distance information composed of only the normal data resulting from the removal of the abnormal data is used to estimate the distances in the distance undefined region in the area, thereby acquiring the accurate distance image without any error caused by the abnormal data.

3. Image Processing Apparatus According to Second Embodiment

An image processing apparatus according to a second embodiment of the present invention will now be described. The process of detecting the abnormal data to remove the abnormal data is performed in the first embodiment described above. In contrast, instead of the removal of the detected abnormal data, a process of moving the detected abnormal data to an adjacent area is performed in the second embodiment.

Specifically, the process is performed to move the distance information determined to be the abnormal data for the area for which the plane definitional equation is calculated and which is subjected to the interpolation process as the distance information about an area adjacent to the target area. The abnormal data detected near the boundary of an area possibly originally belongs to an adjacent area. Accordingly, the abnormal data near the boundary of the area is moved to the adjacent area. In other words, the distance information determined to be the abnormal data for the current target area is used as the distance information corresponding to the adjacent area. However, it is determined again whether the distance information is the normal data or the abnormal data in the processing of the adjacent area.

Also in the destination area, the plane definitional equation is calculated to perform the determination of whether the distance information belongs to the plane. If it is determined that the distance information is the abnormal data, the data is removed.

According to the second embodiment, the above process is performed to effectively reuse the data that has been determined to be the abnormal data in the adjacent area. The interpolation of the area is performed by using the remaining data to acquire the estimated distance values of all the positions in the area. In addition, the estimated distance values are acquired with a higher reliability also in the adjacent area.

FIG. 14 is a block diagram showing an example of the configuration of the image processing apparatus according to the second embodiment of the present invention. Referring to FIG. 14, the image processing apparatus includes the image receiving unit 201, the outline distance estimating unit 202, the area dividing unit 203, the area interpolation unit 210, the image output unit 208, and the control unit 220, as in the configuration of the image processing apparatus of the first embodiment described above with reference to FIG. 8.

The area interpolation unit 210 of the second embodiment includes the plane estimator 204, the abnormal data determiner 205, an abnormal data processor 209, and the area interpolator 207.

The image processing apparatus of the second embodiment differs from the image processing apparatus of the first embodiment only in that the abnormal data remover 206 for the area interpolation unit 210 in the configuration in FIG. 8 is replaced with the abnormal data processor 209.

The abnormal data determiner 205 supplies the abnormal data in one target area, that is, the distance information abnormal data 256 to the abnormal data processor 209.

The abnormal data processor 209 holds the abnormal data until the processing of the subsequent area is started in the area interpolation unit 210. Upon start of the processing of the subsequent area, the abnormal data processor 209 supplies the abnormal data, that is, distance information movement data 351 in FIG. 14 to the abnormal data determiner 205.

The abnormal data determiner 205 determines whether the supplied distance information is the normal data in the processing of the subsequent area. The determination is performed in same manner as in the first embodiment and is based on the amount of shift from the plane set by the plane definitional equation.

FIG. 15 is a flowchart showing an example of a process according to the second embodiment of the present invention. The process in FIG. 15 is performed after the outline distance information 252 (refer to FIG. 9) has been generated in the outline distance estimating unit 202 in FIG. 14 and the area information 253 (refer to FIG. 10) has been generated in the area dividing unit 203 in FIG. 14, as in the process in FIG. 13 described above in the first embodiment. Specifically, the process in FIG. 15 is performed by the area interpolation unit 210 in FIG. 14. The area interpolation unit 210 performs the interpolation process in units of areas set by the area dividing unit 203 under the control of the control unit 220.

Referring to FIG. 15, in Step S201, the control unit 220 in FIG. 14 refers to the area information 253 (refer to FIG. 10) in the area dividing unit 203 to select one unprocessed area for which the interpolation process is not performed.

In Step S202, the plane estimator 204 in FIG. 14 calculates the plane definitional equation or the plane parameters corresponding to the selected area. This step is performed by using information about the space coordinate (x,y,z) resulting from the addition of the distance information (the z coordinate) to the plane coordinate (x,y) of the edge (outline) portion included in the outline distance information 252 generated by the outline distance estimating unit 202, as described above.

The plane definitional equation is calculated by using the multiple pieces of coordinate information (x1,y1,z1) to (xn,yn,zn) on the outline portion of the area by, for example, the least-squares method or the robust estimation method.

Specifically, the parameters a, b, c, and d in the plane definitional equation S: ax+by+cz+d=0 of the area are calculated.

As described above, in the case of an area whose approximate plane can be determined by a specific method other than the least-squares method and the robust estimation method, the distance data on the entire inner area may be determined. Specifically, a histogram of the distance data included in the area is created and, if it is determined that the histogram includes only approximately the same distance data, the entire area is determined to have the distance data that is representative of the histogram. When the plane is estimated by the above process, the interpolation of the distance undefined region in the area (Step S206) can be omitted to reduce the amount of calculation.

In Step S203, the abnormal data determiner 205 in FIG. 14 selects the abnormal data from the outline distance information 252 shown in FIG. 9 generated by the outline distance estimating unit 202. The process of determining the abnormal data in the abnormal data determiner 205 is performed in the manner described above with reference to FIGS. 11A to 11C.

As shown in FIG. 11A, the distance between the plane represented by the plane definitional equation S and each of the pieces of three-dimensional position information (x1,y1,z1) to (xn,yn,zn) included in the outline distance information 252 generated by the outline distance estimating unit 202 is calculated.

For example, a piece of data having the distance $d_i$ between the i-th three-dimensional position data (xi,yi,zi) and the plane S, which is considerably larger than those of the other pieces of data, is determined to be the abnormal data. In other words, it is determined that such a piece of data is the distance information that does not belong to the target area.

Specifically, the comparison with the predetermined threshold value Th may be performed to determine the abnormal data. Alternatively, the average value of the distances between the plane of the area and all the pieces of data (x1,y1,z1) to (xn,yn,zn) acquired as the outline distance information may be calculated, the difference between the average value and each distance $d_i$, may be calculated, and the calculated difference data may be compared with the standard deviation σ of the distances to determine the abnormal data.

In Step S204, the abnormal data determiner 205 in FIG. 14 determines whether the distance information determined to be the abnormal data in Step S203 is moved from an adjacent area. In other words, the abnormal data determiner 205 determines whether the distance information determined to be the abnormal data in Step S203 is supplied from the abnormal data processor 209 (is the distance information movement data 351 in FIG. 14).

If the abnormal data determiner 205 determines that the abnormal data is the distance information moved from an adjacent area (is the distance information movement data 351 in FIG. 14) (Yes in Step S204), the process goes to Step S205. In this case, it is determined that the abnormal data is the data that is determined to be the abnormal data also in, for example, an adjacent area that has been processed. In other words, the abnormal data is the data that is determined to be the abnormal data both in the current area and the adjacent area. In Step S205, the abnormal data processor 209 in FIG. 14 removes the abnormal data.

If the abnormal data determiner 205 determines that the abnormal data is not the distance information moved from an adjacent area (is not the distance information movement data 351 in FIG. 14) (No in Step S204), the process goes to Step S211.

In Step S211, the abnormal data processor 209 in FIG. 14 determines whether an area adjacent to the current area that is the target of the processing in the area interpolation unit 210 is an unprocessed area. If the abnormal data processor 209 determines that the adjacent area is an unprocessed area (Yes in Step S211), the process goes to Step S213. If the abnormal data processor 209 determines that the adjacent area is not an unprocessed area (No in Step S211), then in Step S212, the abnormal data processor 209 sets the adjacent area to an unprocessed area.

In Step S213, the abnormal data processor 209 sets the abnormal data as the distance information about the adjacent area. The distance information is used in the processing of the adjacent area. In other words, the distance information is used as the distance information corresponding to the adjacent area when the processing of the adjacent area is performed in the area interpolation unit 210.

In Step S206, the area interpolator 207 in FIG. 14 uses the distance information normal data resulting from the selection of only the normal data from the pieces of position information (x1,y1,z1) to (xn,yn,zn) included in the outline distance information to perform the interpolation process.

This step is performed in the manner described above with reference to FIGS. 12A and 12B. The area interpolator 207 uses only the distance information normal data included in the distance image after the removal of the abnormal data shown in FIG. 12A from which the abnormal data is removed in the abnormal data determiner 205 to perform the interpolation process to the distance undefined region in the target area (the object A 101). The interpolation process can be performed according to Expression (A) described above.

In the interpolation process, the abnormal data is not used and only the correct distance information all of which is determined to belong to the single object is used. As a result, the interpolation process is correctly performed without the error area and, for example, the correct distance image after the interpolation process shown in FIG. 12B is generated.

In Step S207, the control unit 220 determines whether the interpolation process is completed for all the areas. All the areas mean all areas included in the area information 253 (refer to FIG. 10) in the area dividing unit 203.

If the control unit 220 determines that the interpolation process is not completed for all the areas and any unprocessed area remains (No in Step S207), then in Step S208, the control unit 220 selects one unprocessed area. Then, the process goes back to Step S202 to repeat the steps.

If the control unit 220 determines that the interpolation process is completed for all the areas (Yes in Step S207), the process in FIG. 15 is terminated.

As described above, the image processing apparatus according to the second embodiment of the present invention performs the interpolation process in which the distance information composed of only the normal data resulting from the removal of the abnormal data is used to estimate the distances in the distance undefined region in the area, thereby acquiring the accurate distance image without any error caused by the abnormal data.

In addition, since the distance information determined to be the abnormal data in one area is used again as the distance information in an adjacent area, it is possible to effectively use the initial outline distance information without wasting the outline distance information, thereby generating the accurate distance image.

4. Other Embodiments

The plane definitional equation of each area is calculated to determine whether the distance information is the normal data on the basis of the shift state from the plane defined by the plane definitional equation in the above embodiments. However, the plane composing an object is not limited to a plain surface and may be a curved surface.

When the plane composing an object is a curved surface, the distance information on the outline initially acquired by the contrast detection technology, etc. may be applied to create a curved-surface definitional equation, the distance information may be separated into the normal data and the abnormal data on the basis of the shift state from the created curved surface, and only the normal data may be used to perform the interpolation process in each area on the curved surface.

For example, an equation for a two-dimensional curved surface $ax^2+by^2+cz^2+dxy+eyz+fzx+gx+hy+kz+m=0$ is applicable as the curved surface definitional equation.

With the above equation, the parameters a to h, k, and m in the curved-surface definitional equation are calculated to complete the curved-surface definitional equation. In this case, the plane estimator 204 in the area interpolation unit 210 shown in FIGS. 8 and 14 functions as a curved surface estimator to calculate the parameters a to h, k, and m. The pieces of data $(x1,y1,z1)$ to $(xn,yn,zn)$ on the outline of the area, estimated by the outline distance estimating unit 202, are used in the calculation of the curved-surface definitional equation. For example, the least-squares method or the robust estimation method may be used in the calculation of the curved-surface definitional equation, as in the calculation of the plane definitional equation.

With the above process, even when the plane composing an object is not a plain surface but a curved surface, it is possible to generate the correct distance image.

While the embodiments of the invention have been described using specific terms, it will be further understood by those skilled in the art that changes and variations may be made without departing from the spirit or scope of the following claims. This description is for illustrative purposes only and should not be restrictively interpreted. The scope of the following claims is to be accorded the broadest interpretation so as to encompass all such modifications and equivalent structures and functions.

The series of processing described above may be performed by hardware or software or in a combination of hardware and software. When the series of processing is performed by software, programs having the processing sequence recorded therein may be installed in a memory in a computer incorporated in dedicated hardware to be executed or the programs may be installed in a general-purpose computer capable of executing a variety of processing to be executed. For example, the programs may be recorded in a recording medium in advance. Instead of installing the programs from the recording medium into the computer, the programs may be downloaded over a network, such as a local area network (LAN), and may be installed in a recording medium, such as a built-in hard disk.

The various processes described above may be performed in time series in order of description or may be performed in parallel or individually depending on the processing capacity of an apparatus that performs the processes or according to need.

The present application contains subject matter related to that disclosed in Japanese Priority Patent Application JP 2009-188369 filed in the Japan Patent Office on Aug. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   an outline distance estimating unit that acquires distance information on an outline portion of an area included in an image;
   an area dividing unit that divides the area included in the image on a basis of pixel attribute values;
   an area-plane estimating unit that estimates an area plane composing each area by using the distance information on the outline portion of each area resulting from the division in the area dividing unit to calculate an area-plane definitional equation;
   an abnormal data determining unit that compares the area plane calculated by the area-plane estimating unit with each coordinate position on a three-dimensional space indicated by the distance information acquired by the outline distance estimating unit to determine the distance information having a high degree of shift from the area plane to be abnormal data; and
   an area interpolating unit that estimates distances inside the area by using the distance information resulting from removal of the abnormal data from the distance information acquired by the outline distance estimating unit.

2. The image processing apparatus according to claim 1, further comprising:

an abnormal data processing unit that holds the distance information that is determined to be the abnormal data for a first area included in the image by the abnormal data determining unit, wherein the abnormal data determining unit determines whether data held in the abnormal data processing unit is the abnormal data on a basis of a degree of shift from the area plane in a second area in a determination of the abnormal data in the second area, and wherein, if it is determined that the data held in the abnormal data processing unit is not the abnormal data for the second area, the area interpolating unit applies the data held in the abnormal data processing unit to an interpolation process in the second area.

3. The image processing apparatus according to claim 1 or 2, wherein the area-plane estimating unit calculates parameters a, b, c, and d in a plane definitional equation $ax+by+cz+d=0$ in an xyz three-dimensional space for a plane composing the area divided by the area dividing unit.

4. The image processing apparatus according to claim 1 or 2, wherein the area-plane estimating unit calculates parameters a to h, k, and m in a curved-surface definitional equation $ax^2+by^2+cz^2+dxy+eyz+fzx+gx+hy+kz+m=0$ in an xyz three-dimensional space for a curved surface composing the area divided by the area dividing unit.

5. The image processing apparatus according to claim 1 or 2, wherein the area-plane estimating unit calculates the area-plane definitional equation by using the distance information on the outline portion of the area by a least-squares method or a robust estimation method.

6. The image processing apparatus according to claim 1 or 2, wherein the area-plane estimating unit creates a histogram concerning the distance information on the area, determines whether the created histogram includes only approximately the same distance data, and determines the area plane composing the area to have the same distance if it is determined that the histogram includes only approximately the same distance data.

7. The image processing apparatus according to claim 1 or 2, wherein the abnormal data determining unit compares the distance between the area plane calculated by the area-plane estimating unit and each coordinate position in the three-dimensional space of the distance information acquired by the outline distance estimating unit with a predetermined threshold value to determine the distance information having a distance larger than the threshold value to be the abnormal data.

8. The image processing apparatus according to claim 1 or 2, wherein the abnormal data determining unit calculates an average value and a standard deviation of the distances between the area plane calculated by the area-plane estimating unit and the coordinate positions in the three-dimensional space of multiple pieces of distance information acquired by the outline distance estimating unit and compares the difference between each piece of distance information and the average value with the standard deviation to find the abnormal data.

9. An image processing method performed in an image processing apparatus, the method comprising the steps of:

acquiring distance information on an outline portion of an area included in an image by an outline distance estimating unit;

dividing the area included in the image on a basis of pixel attribute values by an area dividing unit;

estimating an area plane composing each area by using the distance information on the outline portion of each area resulting from the division in the area dividing unit to calculate an area-plane definitional equation by an area-plane estimating unit;

comparing the area plane calculated by the area-plane estimating unit with each coordinate position on a three-dimensional space indicated by the distance information acquired by the outline distance estimating unit to determine the distance information having a high degree of shift from the area plane to be abnormal data by an abnormal data determining unit; and estimating distances inside the area by using the distance information resulting from removal of the abnormal data from the distance information acquired by the outline distance estimating unit by an area interpolating unit.

10. A non-transitory computer-readable storage medium encoded with a program, causing an image processing apparatus to perform image processing, the program comprising the steps of causing:

an outline distance estimating unit to acquire distance information on an outline portion of an area included in an image;

an area dividing unit to divide the area included in the image on a basis of pixel attribute values;

an area-plane estimating unit to estimate an area plane composing each area by using the distance information on the outline portion of each area resulting from the division in the area dividing unit in order to calculate an area-plane definitional equation;

an abnormal data determining unit to compare the area plane calculated by the area-plane estimating unit with each coordinate position on a three-dimensional space indicated by the distance information acquired by the outline distance estimating unit in order to determine the distance information having a high degree of shift from the area plane to be abnormal data; and an area interpolating unit to estimate distances inside the area by using the distance information resulting from removal of the abnormal data from the distance information acquired by the outline distance estimating unit.

* * * * *